US005091034A

United States Patent [19]

Hubert

[11] Patent Number: 5,091,034

[45] Date of Patent: Feb. 25, 1992

[54] MULTI-STEP COMBINED MECHANICAL/THERMAL PROCESS FOR REMOVING COATINGS FROM STEEL SUBSTRATES WITH REDUCED OPERATING AND CAPITAL COSTS AND WITH INCREASED REFRIGERATION SPEED AND EFFICIENCY

[75] Inventor: Jean-Luc Hubert, Willowbrook, Ill.

[73] Assignee: Liquid Air Corporation, Walnut Creek, Calif.

[21] Appl. No.: 594,087

[22] Filed: Oct. 9, 1990

[51] Int. Cl.[5] .......................... B32B 31/18; B32B 31/22

[52] U.S. Cl. .......................... 156/344; 156/584; 51/319; 51/322; 62/62; 62/64; 134/17; 225/93.5; 241/DIG. 37; 264/28

[58] Field of Search .......................... 156/584, 344, 80, 155, 156/498; 51/319, 322; 83/15, 170; 134/17; 225/93.5; 241/DIG. 37; 264/28; 427/398.3, 398.4; 62/62, 63, 64, 65, 75

[56] References Cited

U.S. PATENT DOCUMENTS

| | | | |
|---|---|---|---|
| 2,609,150 | 9/1952 | Bludeau | 62/65 X |
| 3,948,679 | 4/1976 | Lewis | 134/17 X |
| 4,487,643 | 12/1984 | Ellett | 156/344 X |
| 4,589,203 | 5/1986 | Le Diouron | 241/DIG. 37 X |
| 4,627,197 | 12/1986 | Klee et al. | 51/319 |
| 4,692,982 | 9/1987 | Rice | 241/DIG. 37 X |
| 4,705,574 | 11/1987 | Burckhardt et al. | 134/17 |
| 4,956,042 | 9/1990 | Hubert et al. | 156/584 X |

*Primary Examiner*—Michael W. Ball
*Assistant Examiner*—Mark A. Osele
*Attorney, Agent, or Firm*—Oblon, Spivak, McClelland, Maier & Neustadt

[57] ABSTRACT

To remove a thick insulating coating from a steel pipeline, with high efficiency and speed, multiple cooling and scraping steps are performed sequentially. In a first cooling step, a low temperature coolant is sprayed onto the coating for a time sufficient to cool only a portion of the coating to a temperature below the embrittlement temperature thereof. After scraping away the embrittled outer layers of the coating, subsequent cooling and scraping steps are performed until all of the coating has been embrittled and removed. It has been found that the time required for removing the coating by use of such multiple spraying and scraping steps is substantially less than that where the coating is to be embrittled in a single step.

30 Claims, 24 Drawing Sheets

MULTI-STEP COMBINED MECHANICAL/THERMAL PROCESS FOR REMOVING COATINGS FROM STEEL SUBSTRATES WITH REDUCED OPERATING AND CAPITAL COSTS AND WITH INCREASED REFRIGERATION SPEED AND EFFICIENCY

BACKGROUND OF THE INVENTION

1. Field of the Invention

The present invention is directed to a process and apparatus for mechanically removing, by scraping, brushing, sand-blasting or grit-blasting, a coating of low thermal conductivity and of low thermal effusivity, which in addition, is tacky at ambient and above ambient temperature conditions, bonded to a substrate of much higher heat conductivity and much higher thermal effusivity, by first refrigerating the coating in order to render it less tacky and even brittle before mechanical removal. Although the principle of the invention is not so limited, the present invention is directed to dielectric coatings, of organic or non-organic nature bonded onto a metallic substrate, for example organic coatings such as hot or cold applied coal tars, coal tar epoxies, asphalt, polyethylene phenolic baked epoxies, amine cured epoxies or polyvinyl chloroacetates, any of those coatings optionally incorporating inorganic films or fabrics. Furthermore, and more specifically, the present invention is directed to processes for the continuous embrittlement and mechanical removal of outer annular protective coatings such as, but not limited to, coal tar bonded to, an annular steel substrate such as, but not limited to an oil or gas transmission pipeline.

2. Description of the Related Art

Refrigeration apparatuses using cryogenic liquid spray heat transfer are disclosed in U.S. Pat. No. 4,956,042 to Hubert et al and in U.S. Pat. No. 4,963,205, the subject matter of both of which is hereby incorporated by reference. Those applications disclose pipeline traveling liquid nitrogen ($LN_2$) spraying refrigeration tunnels which enable pipeline rehabilitation operations to proceed faster and with complete success in removing a coating and its primer from a pipe or a pipeline, thereby allowing the unimpaired inspection of the pipe for the detection of dangerous corrosion pits and, if necessary, the selection of pipe sections that need to be replaced, in addition to providing a pipe surface of adequate characteristics (first, cleanness, i.e., absence of old coating, old primer, corrosion spots, and second, rugosity) for repriming/recoating (either after scraping alone or in combination with brushing and/or grit- or sandblasting depending on the new coating to be applied and on its required anchor pattern depth).

The process and apparatus described in Hubert et al emphasizes the simplicity of the $LN_2$ tunnel, its incorporation into the typical pipeline traveling equipment and its high speed of refrigeration. The process and apparatus described in U.S. Pat. No. 4,963,205 emphasizes a different design of the $LN_2$ tunnel which results in lower $LN_2$ consumptions, in higher refrigeration efficiencies, in more uniform circumferential refrigeration fields and in high refrigeration speeds compared to the apparatus described in Hubert et al, together with a control/safety/monitoring system for said tunnel.

However, the process and apparatus disclosed in these applications were invented at a time in which typical acceptable pipeline traveling speeds were of the order of 6 feet/min, and speeds of 12 feet/min were considered exceptional. The magnitude of the capital and labor assets immobilized during a pipeline rehabilitation job and the increasing frequency of pipeline rehabilitation jobs due to the aging of the North American and Canadian transmission pipelines to and beyond their expected lifetime, and due to increasing concerns about the safety of older pipelines, have started a new trend in the pipeline industry. Pipeline contractors need to complete the jobs faster. In 1987, 3000 linear feet/day were the norm. Currently, the pipeline industry specifies 7,000 and even 10,000 linear feet/day. Despite their high refrigeration rates, the tunnels of the length disclosed in these applications would not be able to achieve those daily processing rates. Said tunnels could, of course, be lengthened in order to provide the same refrigeration dwell time while traveling faster. However, such an increase in length would generate equipment handling problems, equipment structural integrity problems, equipment driving force problems and problems in the travel of the tunnel around pipe bends.

The above problem is further compounded by the varying thicknesses of outer protective coatings that were applied on the pipelines. Bituminous coatings such as asphalt or coal tar coatings, especially when gravity fed during the initial coating operation, can have thicknesses well in excess of the 60 mils thickness that was implicitly assumed as the norm for bituminous pipeline coatings, and even in excess of the 120 mils thickness that was implicitly assumed as an extreme condition for bituminous pipeline coatings in the above-mentioned applications. Since pipeline outer protective coatings are dielectric in nature (minimum test voltage for a 62 mils thick coal tar coating is 9,800 volts) and resist water penetration, they usually are also good heat insulators (coal tar heat conductivity is about 0.15 W/mK compared to 0.02 W/mK for polyurethane foam insulation and compared to 60 W/mK for carbon steel). Hence, the thicker the coating, the slower the transmission of cold will be from the outer surface of the coating to the steel/coating interface. Especially at larger thicknesses, the coating's heat conduction becomes the process limiting factor, as will be shown in a numerical simulation derived figure. Since the coating must be embrittled through its entire thickness to allow for successful mechanical removal, the operation speed of a tunnel of given length will decrease sharply as the coating thickness increases. Furthermore, since the amount of sprayed cryogen per unit time remains the same, the consumption per linear foot increases accordingly, and since the overall heat removal from steel and coating remains roughly the same, the process efficiency decreases accordingly.

To maintain an admissible operating speed, the tunnels of the above-mentioned applications need to be lengthened, which generates the above mentioned problems and larger capital costs. Lengthening those tunnels would, moreover, not alter the high specific cryogen consumption and the resulting low efficiency, thereby generating high operating costs.

SUMMARY OF THE INVENTION

It is an object of the invention to provide a method for removing dielectric coatings, especially thick coatings, and their primer, at high processing speeds with a drastically reduced total length of tunnel, thereby reducing also the capital costs.

It is a further object of the invention to provide a method for removing dielectric coatings, especially thick coatings at high processing speeds with a drastically reduced specific cryogen consumption per linear foot of pipe and with a drastically increased process efficiency compared to the process disclosed in the above-mentioned applications, thereby reducing also the operating costs.

These and other objects are achieved according to the invention by turning the low heat conductivity associated with a dielectric protective coating from a disadvantage to an advantage. As with all insulating materials, the skin temperature changes rapidly to approach the temperature of the medium it is in contact with. Hence the outer layers of the protective coating can be refrigerated quickly, thereby embrittled quickly, and removed, leaving a residue of coating on the pipe that still needs to be refrigerated but that will present a much reduced resistance to the refrigeration process because of the removed outer layers of coating.

According to the invention, a process for removing dielectric coatings, both organic and inorganic, and especially such coatings with a large thickness, from a support with high efficiency and speed comprises a series of steps including the following: in a first cooling step, a refrigerant medium of sufficiently low temperature such as, but not limited to, cryogenic coolant is applied to the coating for a time sufficient to cool a first portion of the thickness of the coating to a temperature below an embrittlement temperature thereof, the first portion being less than the entire thickness of the coating. Immediately after the cooling step, there is performed a first removal step of removing the embrittled first portion of the coating while leaving a remaining coating. At least one further cooling step is performed, the at least one further cooling step comprising applying a refrigerant medium of sufficiently low temperature such as, but not limited to, cryogenic coolant to the remaining coating for a time sufficient to cool a portion of the thickness of the remaining coating to a temperature below the embrittlement temperature thereof. Immediately after each at least one further cooling step, there is performed a further removal step of removing the embrittled portion of the remaining coating. The at least one further cooling step includes a final cooling step in which the portion of the thickness of the remaining coating is the entirety of the thickness of the remaining coating.

The refrigeration means used by the process for the cooling steps can be any one of a multitude of possible designs. Said designs include tunnel means which apply either a forced ventilation of sufficiently cold gas around the radial outer surface of the coating, or a spraying onto- or circulation around the radial outer surface of the coating of a sufficiently cold liquid, said liquid having a boiling point either below (which yields boiling upon contact, and therefore a two-phase heat transfer process) or above (which does not lead to boiling upon contact, single phase heat transfer process) the temperature of the coating, or a combination of the two above described processes. For illustration purposes, and for deriving experimental confirmation, the refrigeration means may consist of tunnel means spraying liquid nitrogen onto the outer radial surface of the coating.

The $LN_2$ tunnel(s) used according to the invention can be the same as those disclosed in said U.S. patents except for tunnel lengths, not necessarily, and typically not, equal to those disclosed in said U.S. patents, while retaining the same design and construction guidelines as those disclosed in said U.S. patent applications. However the invention applies to any type of refrigeration tunnel that might be used on the pipeline, whether it uses a cold liquid spray heat transfer or a cold gas convection heat transfer or a combination thereof.

Moreover, the invention is not limited to the cleaning of outer protective coatings from transmission pipelines. Conceivably, there may be other applications where the same principle can be used, including stripping paint deposits on various supports, or stripping floor coverings in automated manufacturing plants.

An important feature of the invention is the division of the previously single step of refrigerating/scraping into at least two such steps, which division reduces the total length of refrigeration equipment required to achieve a given processing speed under any given conditions. Additionally, the division reduces capital costs for a given result and makes it possible to process the pipe (in the case of the application of that invention to the pipeline rehabilitation field) at the speeds presently specified by the pipeline industry (without the invention, the required length of refrigeration equipment would be practically unfeasible). The division also makes it possible to process thick coatings at acceptable speeds and costs, and reduces the overall cryogen consumption by more than 50% on thick coatings.

The invention is not limited by the examples given be it in terms of pipe thickness, pipe diameter, or coating thickness, or coating type or number of tunnels (or steps). Every field pipeline rehabilitation job is different and operating parameters may be adjusted accordingly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11 is a schematic plan view of an apparatus for carrying out a comparative example upon which FIGS. 9 and 10 are based;

DETAILED DESCRIPTION OF THE PREFERRED EMBODIMENTS

Figure 1:
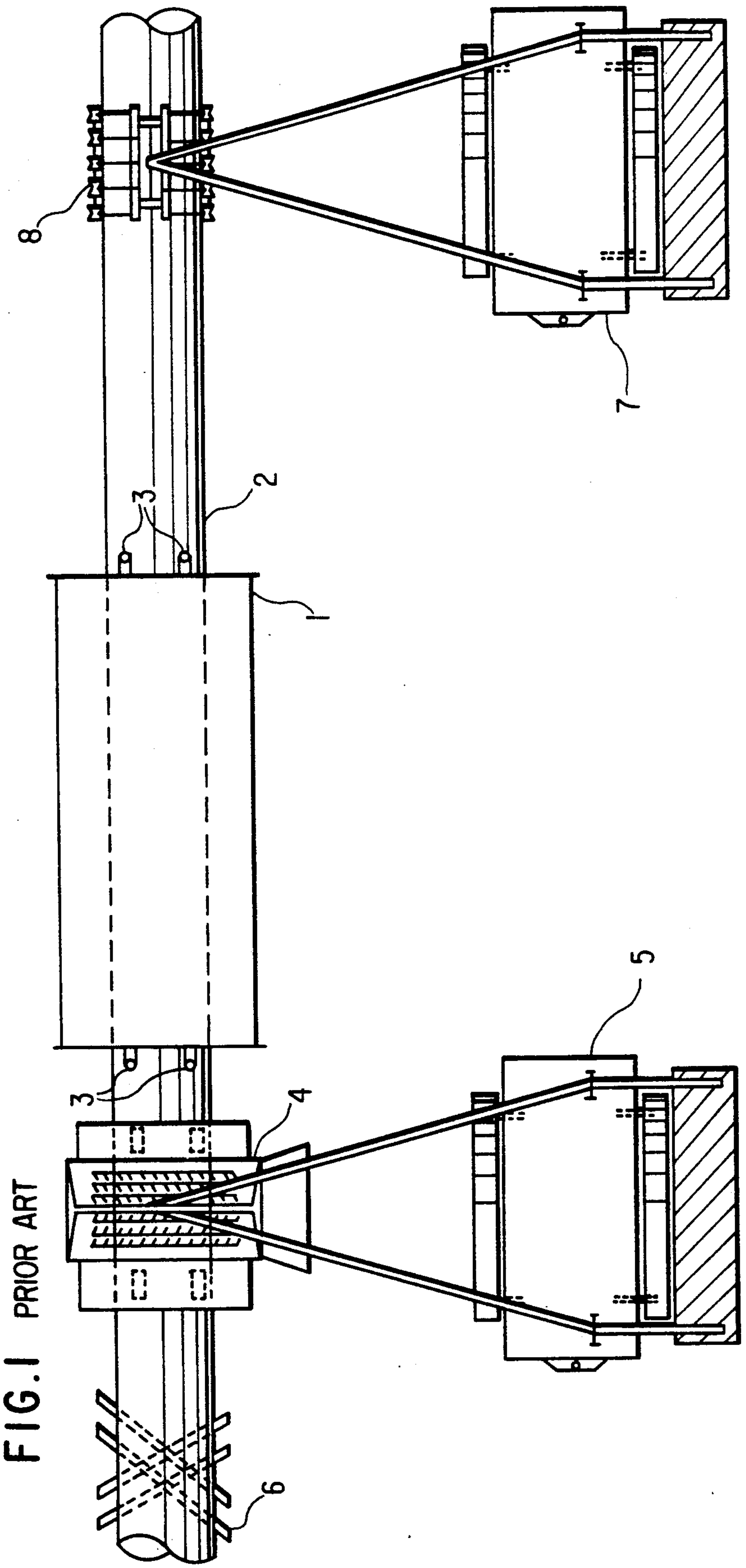
FIG. 1 PRIOR ART
FIG. 1 is a schematic plan view of a conventional pipeline cleaning equipment and of a coating refrigeration/embrittlement tunnel.

Generally, as illustrated in FIG. 1, a refrigeration apparatus 1, which may be used in the present invention according to one illustrative embodiment, may be essentially cylindrical in geometry, is located on the coated pipe 2 and is fitted with wheels 3 that allow its longitudinal travel along the pipe 2. The refrigeration apparatus 1 is connected to a self propelled pipeline traveling cleaning machine 4 which may be a sand or grit blaster or may be a scraper machine with rotating spring loaded steel blades or brushes or, in some cases, a series combination thereof. The cleaning machine 4 is supported by a side boom 5 to avoid excessive tilting of the scraper around the pipe. The coated pipe 2 is supported by wooden beams 6 upstream of the operation and lifted by a second side boom 7 using wrap around cradles or steel wheel cradles 8.

More specifically and as described in U.S. Pat. Nos. 4,956,042 and 4,963,205 illustrated in FIG. 2, said refrigeration apparatus 1 is a tunnel means in the form of a rigid, insulated cylindrical tunnel body 10 which is supplied with a system for expanding pressurized $LN_2$ cryogen into the bore of the tunnel body. The system includes external longitudinal manifold 11, the tunnel external quarter-circumferential manifolds 12, a cryogen delivery line composed of flexible insulated segments 13 and 14 and of rigid insulated segments 15 and 16, and extending from the mobile $LN_2$ vessel 17 mounted on tracks 18 (one pair in the case of a small vessel such as 2,000 gallons, two pairs in the case of a large vessel such as 6,000 gallons) to said tunnel 10. The mobile vessel 17 is pulled by the first side boom 5. Details of the construction of the tunnel and the system for expanding pressurized $LN_2$ cryogen into the bore thereof are described in detail in the aforementioned U.S. patents.

Figure 2:
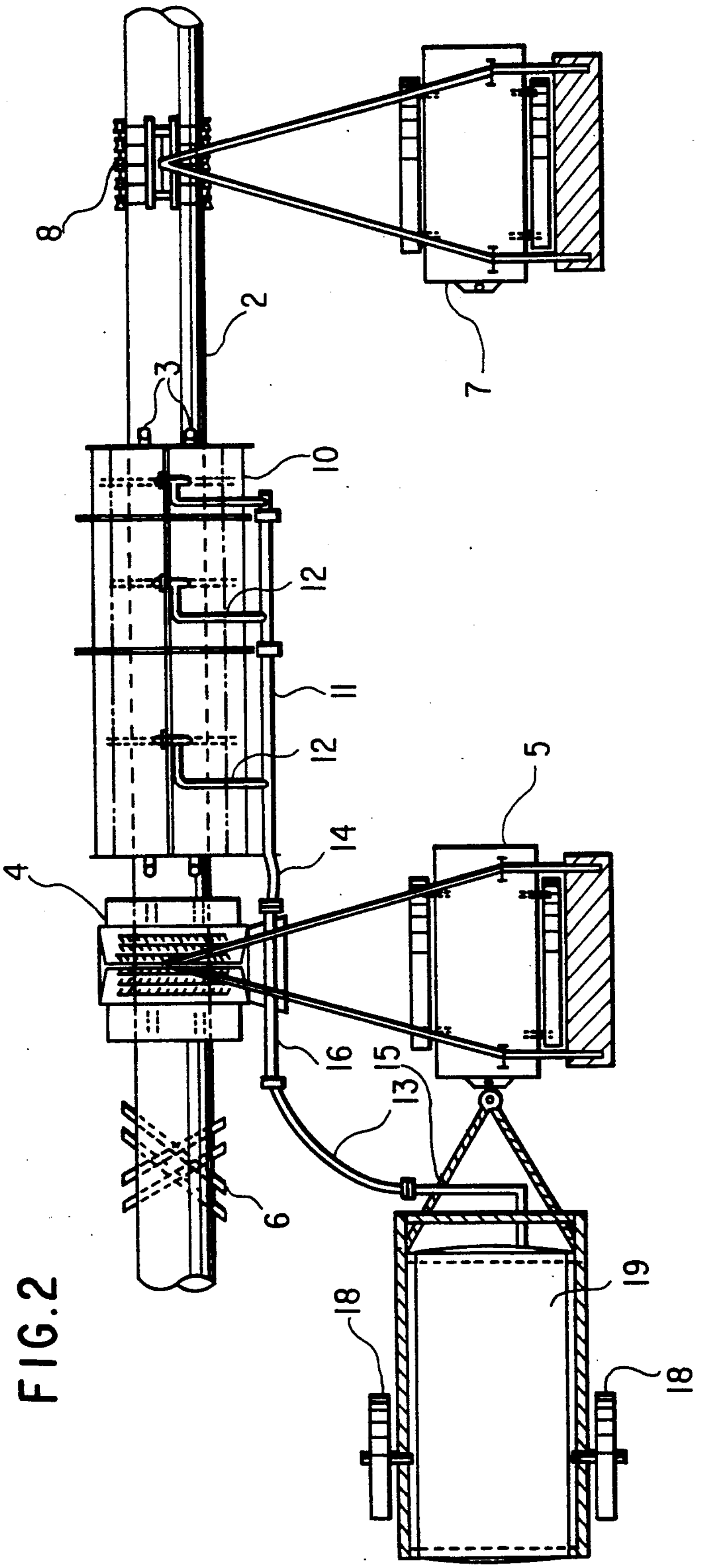
FIG. 2 corresponds to FIG. 1 but further illustrates the system for expanding pressurized $LN_2$ cryogen into the bore of the tunnel body.
Figure 3:
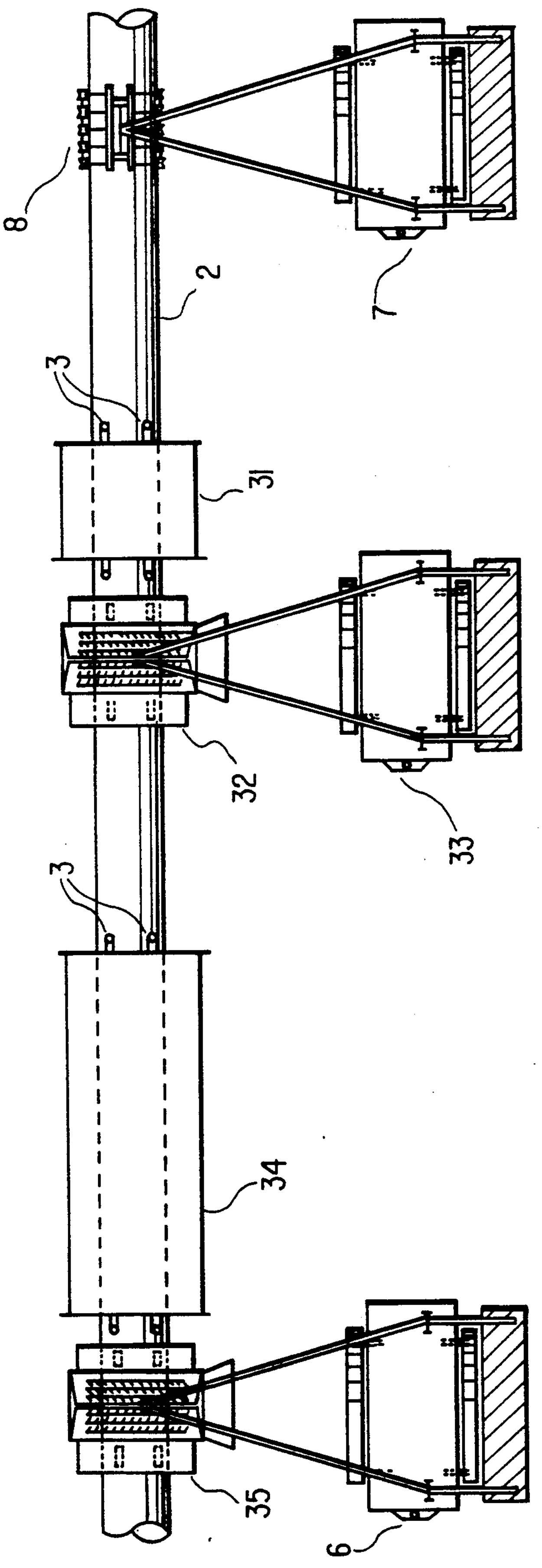
FIG. 3 is a schematic plan view of an example of an apparatus for carrying out the present invention.

According to an example of the present invention, and as illustrated in FIG. 3, the process of refrigerating the coating throughout its thickness to the coating embrittlement temperature is replaced by a process in which a first refrigeration apparatus 31 cools the upper layers of the coating to below its embrittlement temperature. The refrigeration apparatus 31 may operate by expanding pressurized $LN_2$ cryogen, as in FIGS. 1 and 2. On the other hand, it may rely on the forced venting of a cold gas, or the forced circulation or spraying of a cold liquid having a high or low boiling point. A first mechanical removal means 32 removes the embrittled upper layers of the coating. A first side-boom 33 supports the mechanical removal means 32 which is operatively connected to the first refrigeration apparatus 31 in a conventional fashion. In this process, at least one further refrigeration apparatus 34, one further mechanical removal means 35 and one further supporting side boom 36 follow the upstream elements 31, 32 and 33, preferably at the same speed as elements 31, 32, 33, and embrittle and remove the remaining coating on the pipe (or a portion of the remaining coating if more than two side boom/refrigeration apparatus/mechanical removal means are used).

The refrigeration apparatus 34 may operate by expanding pressurized $LN_2$ cryogen, as in FIGS. 1 and 2. On the other hand, it may rely on the forced venting of a cold gas, or the forced circulation or spraying of a cold liquid having a high or low boiling point. Refrigeration apparatuses 31 and 34 typically, but not necessarily, utilize the same heat transfer mechanism.

Figure 4:
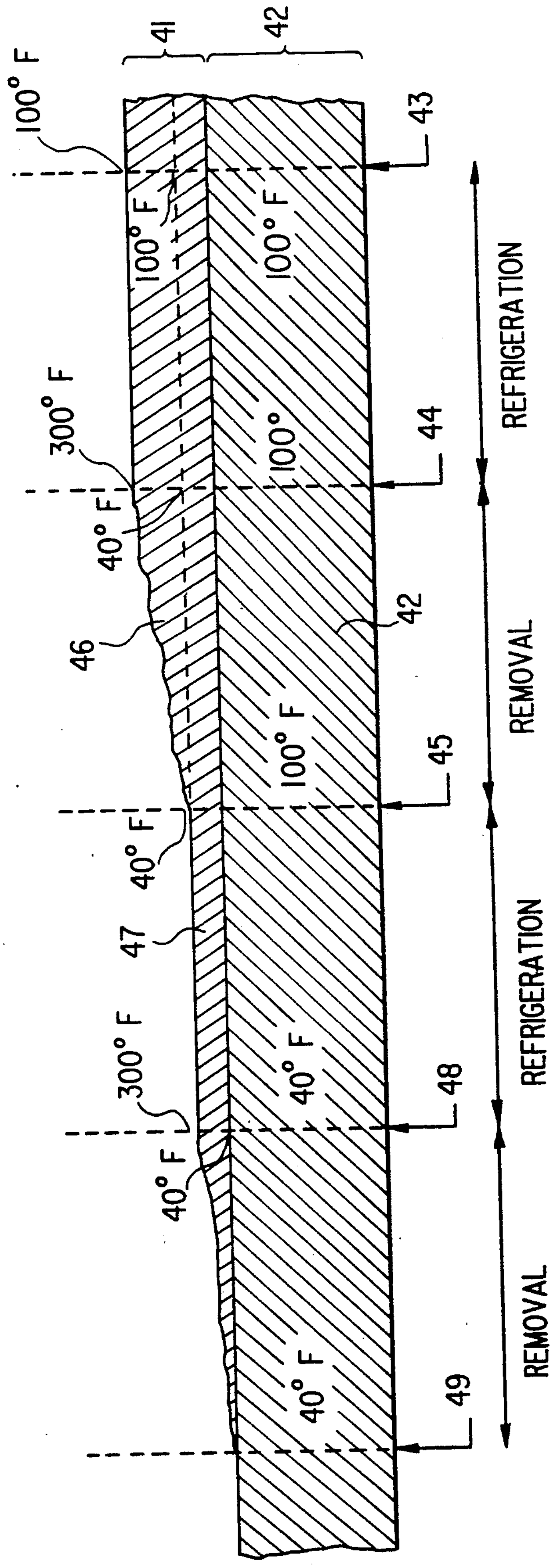
FIG. 4 is a schematic illustration showing the removal of coating from a support according to the process of the present invention.

The process of the present invention is schematically illustrated in FIG. 4 in which the coating 41 and steel 42 thicknesses and temperatures are shown in section along the length of pipe between start of processing and end of processing. At location 43, the steel, whose thickness ranges up from 0.280 inch (preferably 0.432 inch) for a small 6 inch diameter pipe to 0.375 inch (preferably 0.500 inch) for a large 42 inch diameter pipe in ANSI B36.10 Standard Strength (the preferred values corresponding to ANSI B36.10 Extra Strength), and the coating, whose thickness is greater than 0.010 inch, and usually ranges from 0.050 inch to 0.250 inch, are at their initial temperature which ranges from 70° F. to 150° F. depending on the atmospheric conditions at the time of processing.

At location 44, the upper layers (first portion) of the coating have been refrigerated to below an embrittlement temperature, which ranges from 40° F. to 60° F. for coal tar depending on the aging process it was subjected to. The outer skin of the coating is then at a temperature close to the temperature of the cooling medium being used. Preferably at least 20% of the coating thickness is embrittled by the first refrigeration apparatus 31 of FIG. 3. The optimum percentage or percentage range of coating to be embrittled by apparatus 31 is such that the embrittled coating depth versus the corresponding required refrigeration time is optimized under the constraint that the remaining coating is thin enough (60 mils or less) to allow for a rapid processing of the remaining coating when the multi-step process consists of only two steps. In other words, a balance is necessary between the first and the second cooling steps in order to minimize the total dwell time. The simulation examples and test data contained in the description of the present invention show that up to 75% of the coating can be embrittled by apparatus 31 while keeping the total dwell time low since the 75% embrittlement requires less than 25% of the dwell time that would be required to embrittle 100% of the coating with apparatus 31 alone. They also show that embrittling the upper 50% of coating requires 20% or less of the dwell time that would be required to embrittle 100% of the coating with apparatus 31 alone. Hence, the preferred upper coating embrittlement percentage of apparatus 31 when the multi-step process consists of only two steps is 50% to 75%. The actual embrittled thickness percentage will be function of the length ratio between apparatus 54 and 51 of FIG. 5 when using $LN_2$ spray heat transfer, since both apparatus travel at the same speed and are desired to have the same flow rate per foot of length of tunnel (same tunnel design). The length ratio between apparatus 54 and 51 can be very flexible, given the flexibility that was provided by the tunnel design of U.S. Pat. No. 4,963,205. Nevertheless, length ratios around 2 or around 3 are preferred. For thicker coatings the preferred thickness percentage of embrittled coating by apparatus 31 may be reduced, especially since thicker coatings may be better processed in a three step rather than a two step process.

At location 45, the upper layers 46 of the coating have been mechanically removed by the first mechanical removal means 32 after their prior embrittlement and there remains a thinner (remaining) coating 47 on steel 42.

At location 48, the remaining coating 47 has been embrittled by the second refrigeration apparatus 34 of FIG. 3 and at location 49 the coating 47 and the primer have been removed by the second mechanical means 35 of FIG. 3, thereby completing the process of continuously cleaning the pipeline.

Figure 5:
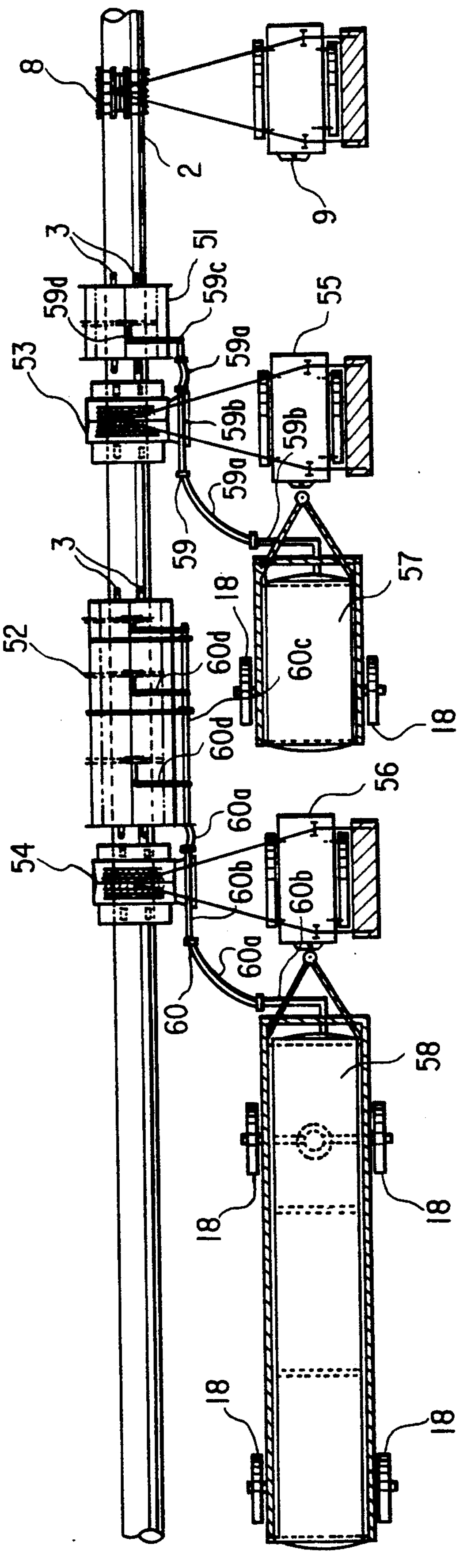
FIG. 5 corresponds to FIG. 3 but shows the system for expanding pressurized $L\check{N}_2$ cryogen into the bore of the tunnel bodies.

FIG. 5 illustrates an embodiment according to the present invention when using refrigeration tunnels 51 and 52 the type disclosed in the aforementioned U.S. patents or of a similar type. Each tunnel 51 and 52 is operatively connected to one pipeline traveling self propelled pipe cleaning machine, respectively 53 and 54, which may be a sand or grit blaster or a scraping machine fitted with spring loaded rotating knives or brushes. Cleaning machine 53 is preferably of the type fitted with counterrotating blades since 53 will usually do the bulk of the coating removal (e.g. removal of the outer 50 to 75% coating layers) and since sand or grit blasting is costlier than scraping. On the other hand, cleaning machine 54, which does the finishing job may be any one of a variety of types depending on the thickness of the remaining coating after 53 and on the desired end result: if the thickness of the remaining coating is small (e.g., 30 mils or less) and if the desired end result is a very specific anchor pattern in addition to cleanness, cleaning machine 54 will preferably be of the sand or grit blasting type; if the remaining coating thickness is large (e.g. 60 mils or more) but if the desired end result is principally the cleanness of the pipe without having to achieve a very specific anchor pattern, cleaning machine 54 will preferably be of the type that is fitted with both rotating knifes (upstream), whose function is to remove the bulk of the remaining coating, and rotating brushes (downstream of the knifes), whose function is to remove the last coating residue patches especially near the girth welds and the seam welds; if the remaining thickness is large (e.g. 60 mils or more) and if the desired result is a very specific anchor pattern in addition to cleanness, cleaning machine 54 will preferably be a combination of an upstream scraper with rotating knifes, possibly with rotating brushes added, and of a downstream sand- or grit-blaster, where the upstream portion of 54 removes the bulk of the remaining coating while the downstream portion of 54 generates the anchor pattern. Each pipe cleaning machine 53 and 54 is supported by one side-boom, respectively 55 and 56. Each side boom 55 and 56 pulls one $LN_2$ vessel mounted on tracks (or equivalent travel and support means, e.g., balloon tires), respectively 57 and 58. Each $LN_2$ vessel 57 and 58 delivers liquid nitrogen to one tunnel, respectively 51 and 52, through a delivery line, respectively 59 and 60, consisting of insulated flexible hoses, **59*a* and 60*a*, of insulated rigid pipe segments, 59*b* and 60*b*, of longitudinal external manifolds, 59*c* and 60*c*, and of several quarter circumferential external manifolds, 59*d* and 60*d***.

The following is a description and explanation of the benefits derived from the present invention. It is based both on theoretical analysis through computerized numerical simulation of the process, on actual test data obtained with the tunnel disclosed in U.S. Pat. No. 4,963,205, and on total consumption, efficiency, and equipment length comparisons between what is achievable with the embodiments of the invention compared to what is achievable with the conventional art.

Figure 5A:
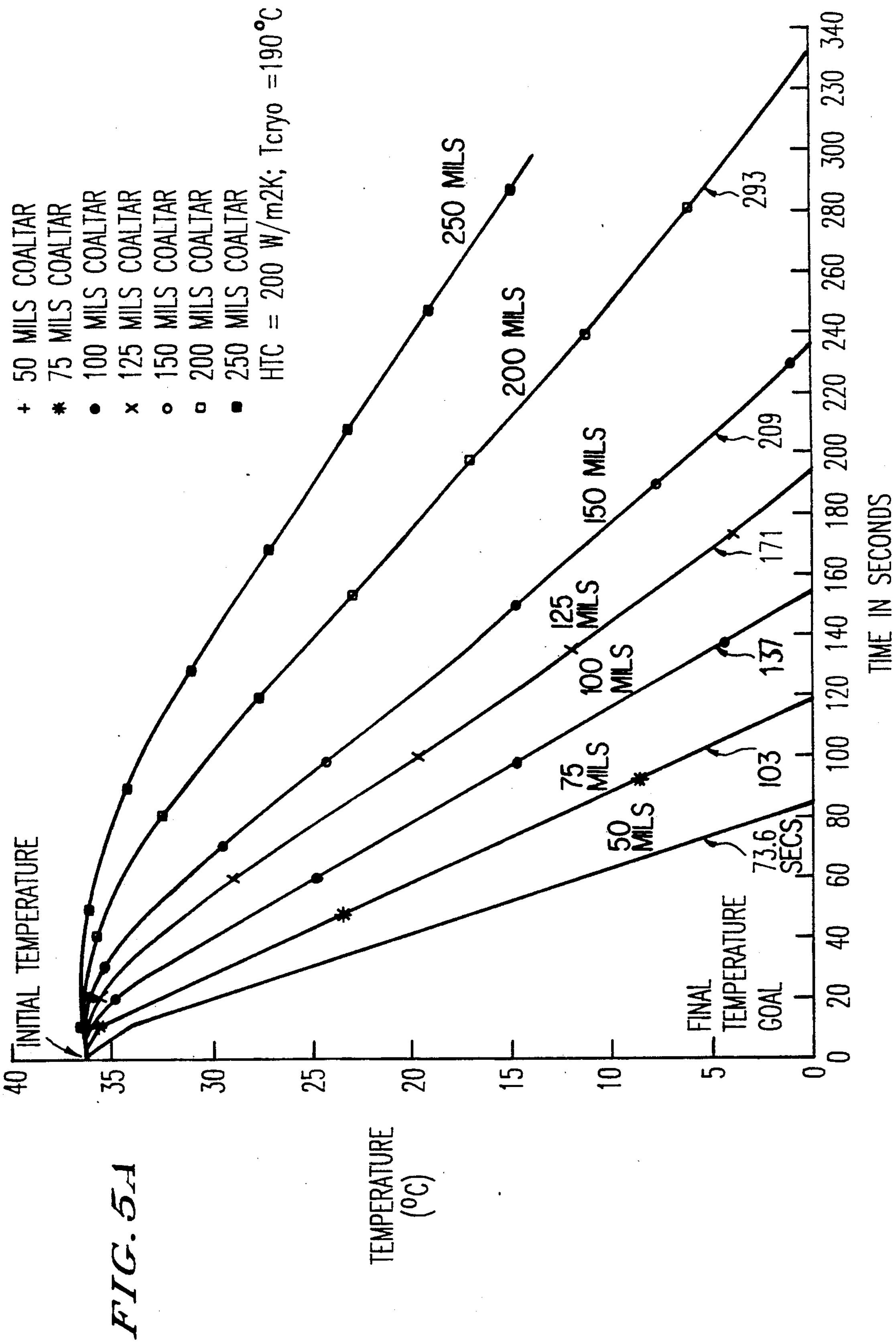
FIG. 5*a* is the result of numerical simulations and shows the temperature evolution curves of a $\frac{3}{8}$ inch thick steel support coated with various thicknesses ranging from 50 mils to 250 mils under given and identical heat transfer conditions (heat transfer coefficient of 200 $W/m^2K$, refrigerant medium temperature of −190° C.)

FIG. **5*a* shows the temperature evolutions of a $\frac{3}{8}$" thick steel support coated with various thicknesses of a coating of the same thermophysical characteristics as coal tar (characteristics listed below in reference to FIGS. 6 and 7) and subjected to given, constant heat transfer conditions (200 $W/m^2K$ and −190° C.). Those temperature evolutions result from composite material heat conduction with convective boundary conditions computer models. Initial temperature of the steel is 38° C. (100° F.). If we assume that the coating is brittle at −5° C. (41° F.), FIG. 5*a*** shows that complete embrittlement of the coating, from outer layer to steel interface, will require:

73.6 secs with 50 mils
103 secs with 75 mils
137 secs with 100 mils 171 secs with 125 mils
209 secs with 150 mils
293 secs with 200 mils
381 secs with 250 mils The increase in required dwell time is roughly proportional to the thickness of the coating. That means that the processing speed of a refrigeration tunnel, creating those heat transfer conditions, will drop roughly proportionally to the inverse of the thickness of the coating, that the refrigerant specific consumption will increase roughly proportionally to the coating thickness and that the efficiency of the process will drop almost proportionally to the inverse of the thickness of the coating (since the heat released by the coating, although not negligible, is smaller than the heat released by the steel) for the same temperature drop. For example, a tunnel processing a 75 mils coated ⅜" thick steel pipe at a speed of 12 feet per minute, at a specific consumption of three gallons of refrigerant per foot of pipe and at a thermodynamic efficiency of 50% can be forecasted to process a 200 mils coating at the much reduced speed of 4.50 feet per minute, at the much increased specific consumption of eight gallons refrigerant per foot of pipe and at the much reduced thermodynamic efficiency of roughly 20%. Tests performed with the tunnel disclosed in U.S. patent application Ser. No. 07/434,814 on a 30" $\phi$, ⅜" thick nominal, steel pipe coated with 60 mils, then 120 mils, then 180 mils have confirmed qualitatively and quantitatively, the relationship between coating thickness ratios and the ratios of processing speeds (or dwell times), of specific consumptions and of thermodynamic efficiencies.

Figure 6:
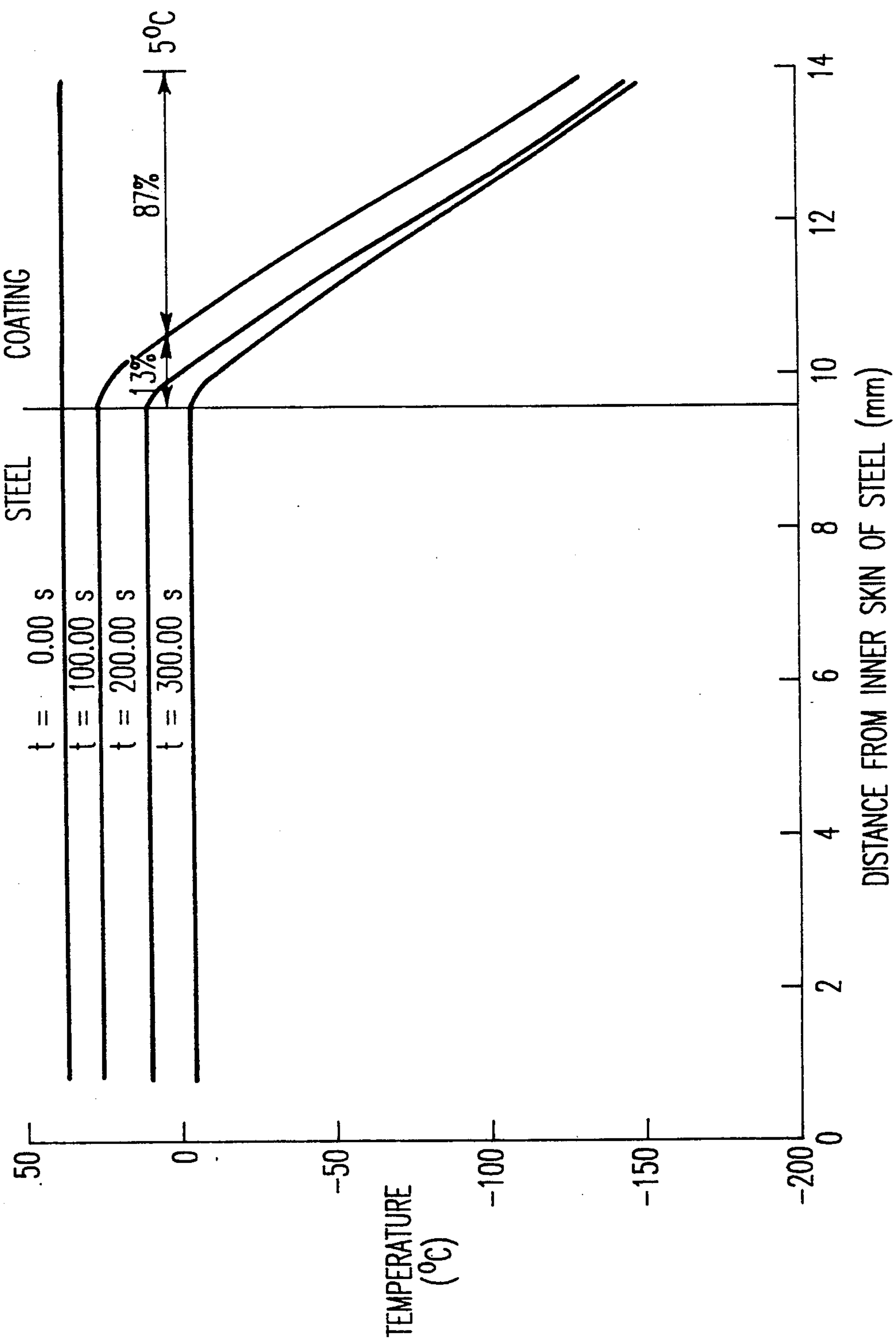
FIG. 6 is the result of a simulation and shows the radial temperature profile in a $\frac{3}{8}$ inch fixed steel support and a 3/16 inch thick coating under stationary refrigeration, at 250 $W/m^2K$ and −190° C.
Figure 7:
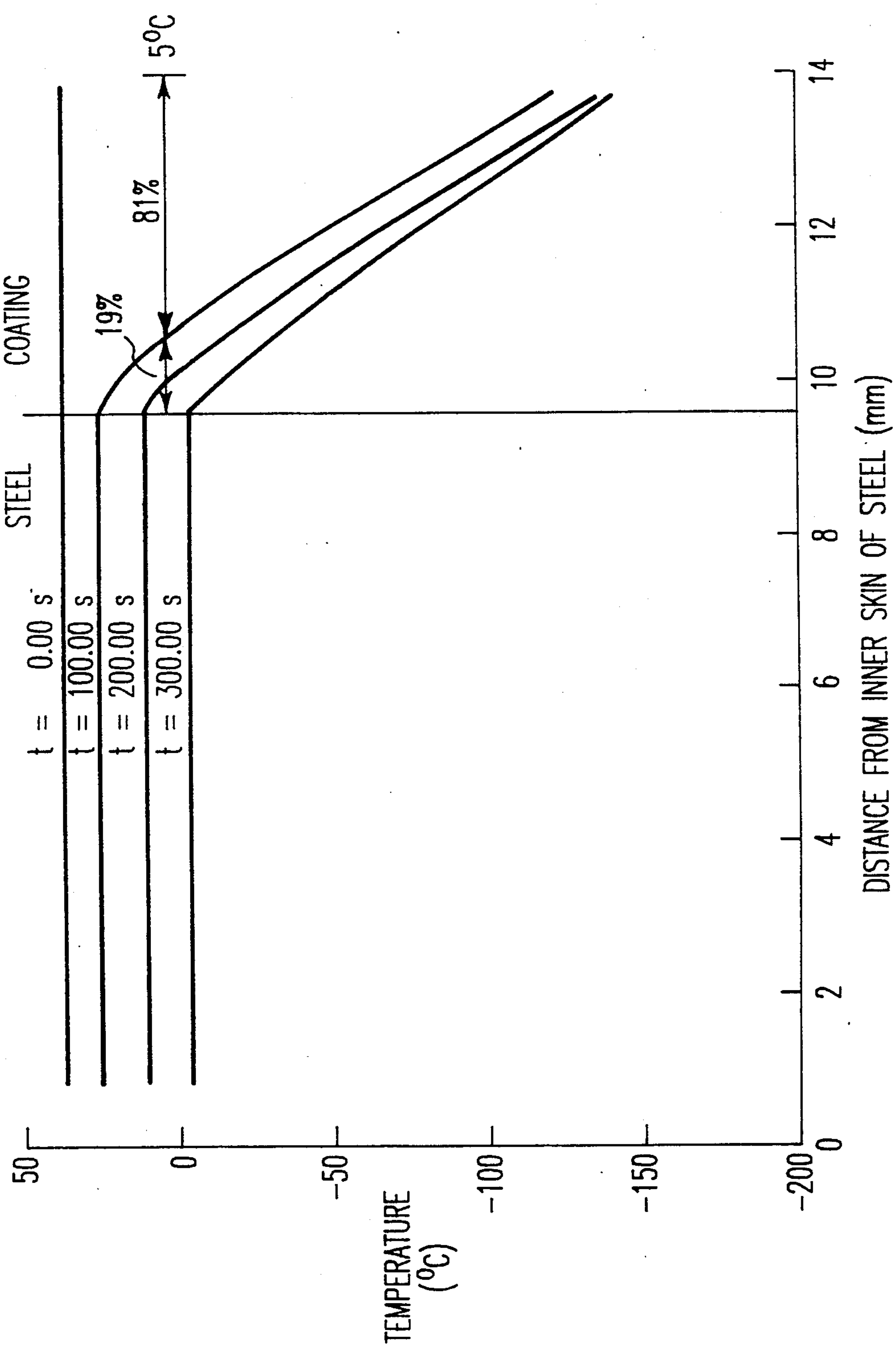
FIG. 7 corresponds to FIG. 6, but at 150 $W/m^2K$ and −190° C.

FIGS. 6 and 7 show the radial temperature profile in a ⅜" thick steel pipe coated with 3/16" (equal to 188 mils) of coal tar coating at time 0 (initial temperature=35° C.=95° F.) and after 100, 200 and 300 seconds of cooling with a cold medium at a temperature of −190° C. (liquid or gaseous nitrogen). The thermophysical characteristics of the coal tar coating were approximated at (from *Perry's Chemical Engineer's Handbook,* 6th Ed.):

0.15 W/mK for heat conductivity
1,500 J/kgK for specific heat capacity
1,250 kg/$m^3$ for specific mass while the thermophysical characteristics of carbon steel are well known. FIG. 6 was based on the assumption of a 250 W/$m^2$K heat transfer coefficient while FIG. 7 was based on the more moderate assumption of a 150 W/$m^2$K heat transfer coefficient. As can be seen on FIG. 6, 87% of the coating thickness has been lowered to below 5° C. (41° F.) after 100 seconds of refrigeration and is, therefore, brittle and can be removed. FIG. 6 also shows that it would take 240 seconds of cooling to lower all of the coating thickness to 5° C. The more moderate heat transfer conditions of FIG. 7 do not have a significant impact on the quantitative data: 81% of the coating thickness is below 5° C. and therefore brittle and removable after 100 seconds of refrigeration while it would take about 270 seconds to embrittle all of the coating thickness.

Figure 8:
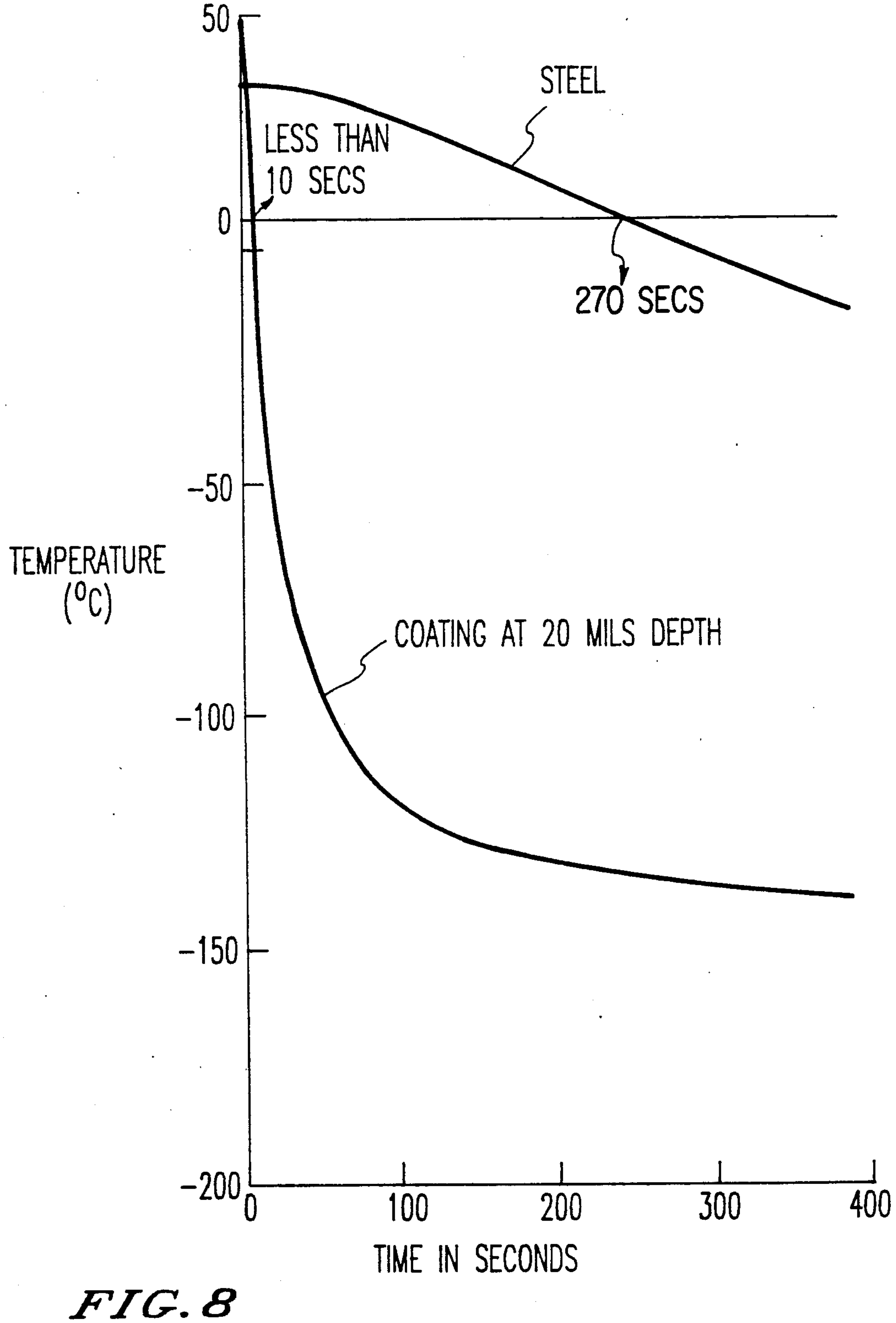
FIG. 8 illustrates the results of a simulation of temperature evolution of a $\frac{3}{8}$ inch thick steel support and a 3/16 inch thick coating, at a 20 mil depth under the surface of the coating, considering stationary refrigeration with 150 $W/m^2K$ and −190° C.

FIG. 8 shows the computed temperature evolution of the steel (no discernable temperature gradient in the steel on that scale) and of the coating at 20 mils depth from the outer skin (i.e., about 11% of the coating total thickness) with time under the aforementioned moderate heat transfer conditions. As can be seen from FIG. 8, the upper 11% of the coating is embrittled within a very short time (less than 10 seconds) while the steel (and therefore the coating at the steel interface) requires about 270 seconds to reach the embrittlement temperature of 5° C.

Figure 9:
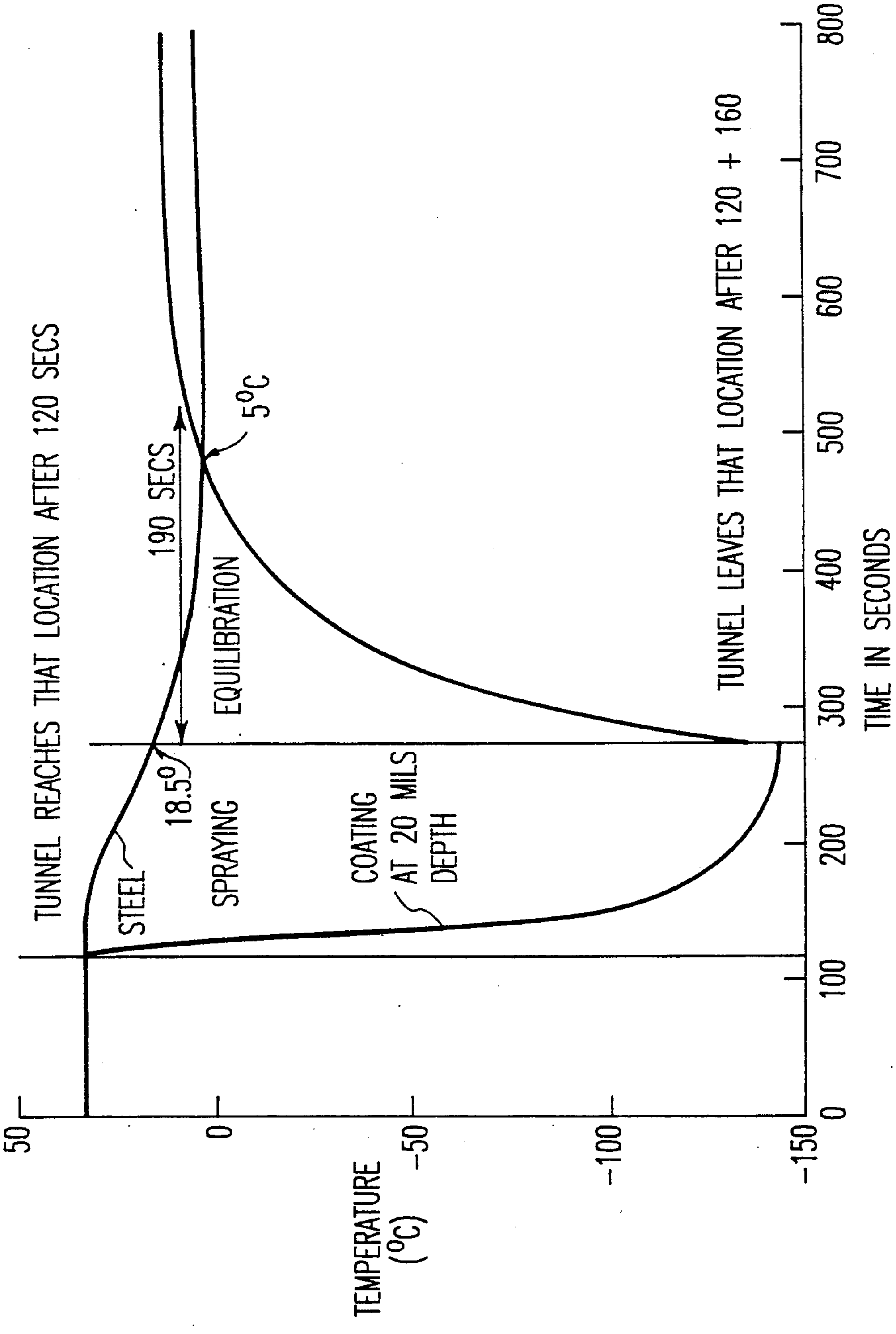
FIG. 9 corresponds to FIG. 8, but for a moving refrigeration tunnel with a dwell time of 160 seconds and a 250 $W/m^2K$ heat transfer coefficient.
Figure 10:
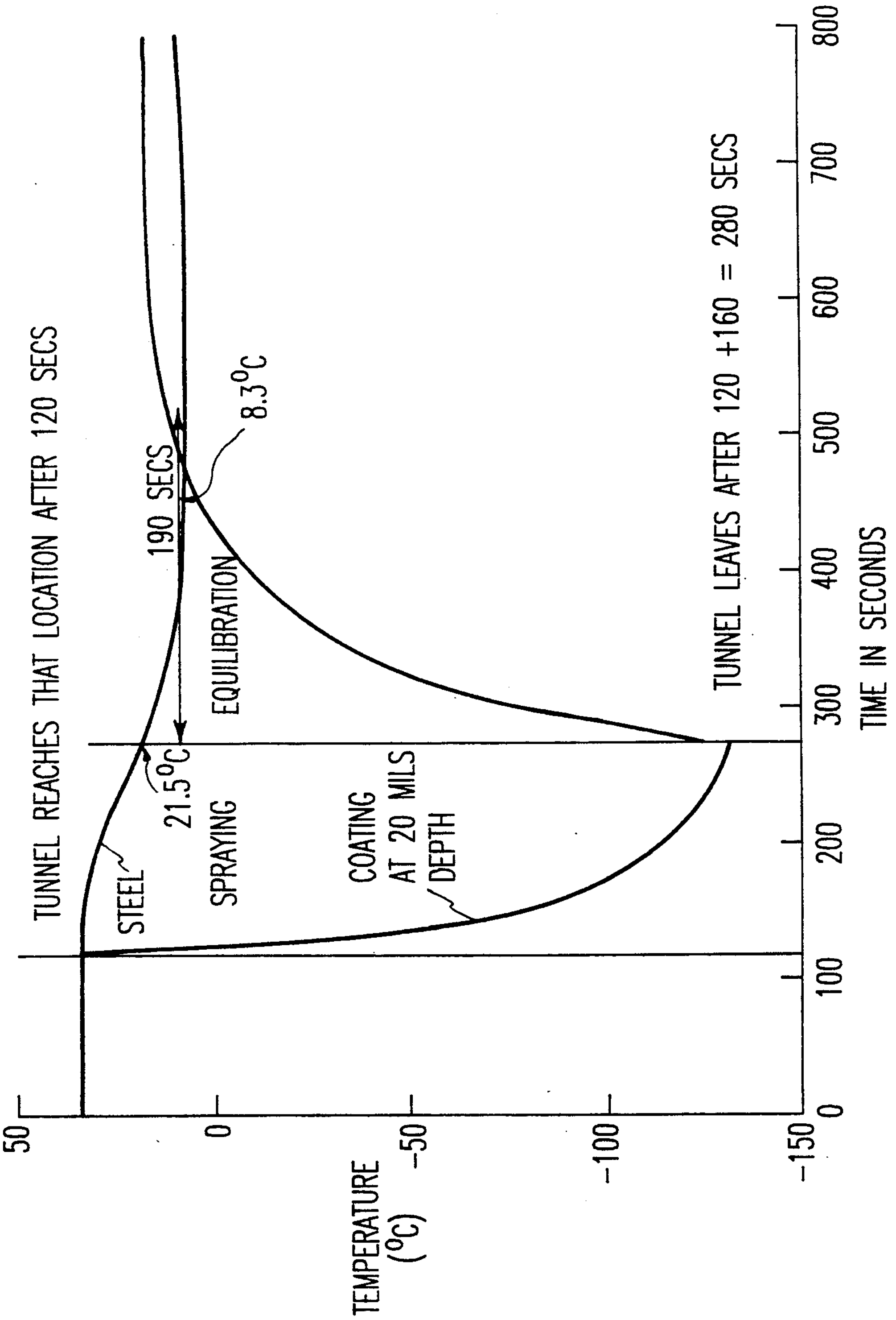
FIG. 10 corresponds to FIG. 9, but for 150 $W/m^2K$.

FIGS. 9 and 10 are similar to FIG. 8, inasmuch as they show the temperature evolution with time of the steel and of the coating at 11% depth, under 250 W/$m^2$K for FIG. 9, and under 150 W/$m^2$K for FIG. 10. The important difference is the fact that FIGS. 9 and 10 were established with a moving refrigeration tunnel (dwell time of 160 seconds) while FIGS. 6 through 8 inclusive assumed stationary cooling. In both figures, it is apparent that the coating at 11% depth drops very rapidly in temperature and that the upper 11% of coating thickness are embrittled very quickly (within less than 10 seconds in both cases), and that the steel substrate, and therefore the coating at the steel interface cools much slower and in fact does not reach the desired embrittlement temperature of 5° C. within the allocated 160 seconds dwell time: it only reaches 18.5° C. (a 16.5° C. temperature drop) in FIG. 9 and 21.5° C. (a 13.5° C. temperature drop) in FIG. 10. Once the refrigeration apparatus leaves that section of the pipe, the coating temperature at 11% depth rises rapidly, due to heat conduction to the inner layers and the steel (which explains the continued decrease in temperature of the steel after the end of dwell time) and towards the outer layers and the ambient atmosphere. In FIG. 9, the continued temperature decrease of the steel brings it to 5° C. at the same time as the coating at 11% depth reaches 5° C. in its warming phase. In FIG. 10, by the time the coating at 11% depth has reached 5° C. in its warming phase, the steel has not reached 5° C. but only 8.3° C.

Hence, FIGS. 9 and 10 show that it would be possible for the steel to reach the embrittlement temperature of the coating (5° C. in this case) by adjusting the refrigeration dwell time until the equilibration time (i.e., the time during which the coating at 11% depth warms up but not beyond 5° C., and preferably not beyond −5° C. since the outer skin is conceivably warmer than the coating 20 mils deeper) enables the steel to reach the 5° C. mark by "pumping" the cold stored in the coating.

The above embodiment is a comparative example and has several drawbacks. First, finding just the right refrigeration dwell time that will allow the steel to reach the coating embrittlement temperature during the equilibration phase may be feasible under lab conditions but is extremely difficult in the field where coating and steel temperatures and thicknesses are not constant but vary along the pipeline. Second, the equilibration time is relatively long: 190 seconds in the cases of FIGS. 9 and 10. Hence, the distance between the refrigeration apparatus 1 and the cleaning machine 4 of FIG. 1 becomes quite long: 19' when moving at 6 fpm, 38' when moving at 12 fpm, 57' when moving at 18 fpm. An operative connection fixture between refrigeration apparatus 1 and cleaning machine 4 of such length is not practical, not only because of structural problems, but also because of travel of the complete assembly around pipe bends. Third, there is only a slight improvement made towards lowering the cryogen consumption and increasing the efficiency of the refrigeration apparatus since the coating, or insulation, thickness remains the same throughout the process.

Figure 11:
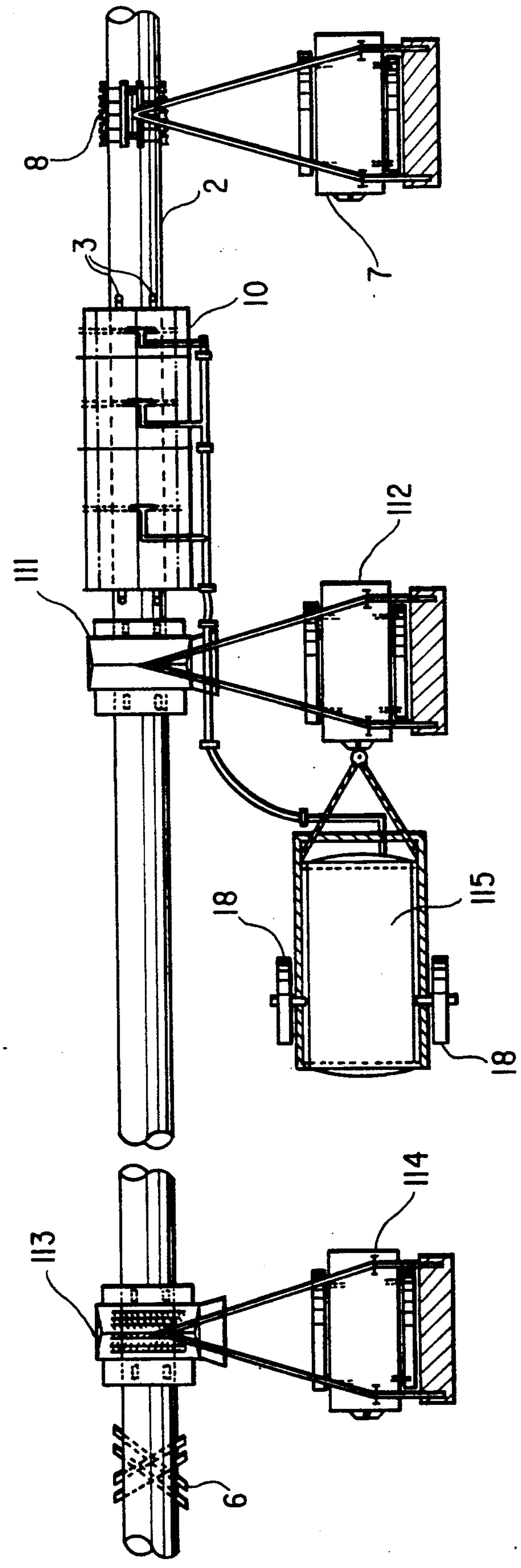

The above outlined method would require the refrigeration apparatus 1 of FIG. 1 to be self propelled or connected to a pipeline traveling cleaning machine 111 shown in FIG. 11 whose knives and/or brushes have been removed and which is used for the sole purpose of propelling the refrigeration apparatus 1 of FIG. 1 or 10 of FIG. 2. Those propelling means 111 would still require a dedicated side boom 112 and would be followed, at the appropriate distance as outlined above, by the actual cleaning machine 113 and its side boom 114. The $LN_2$ track mounted vessel 115 would be located between side booms 112 and 114 and pulled by side boom 112.

Figure 12:
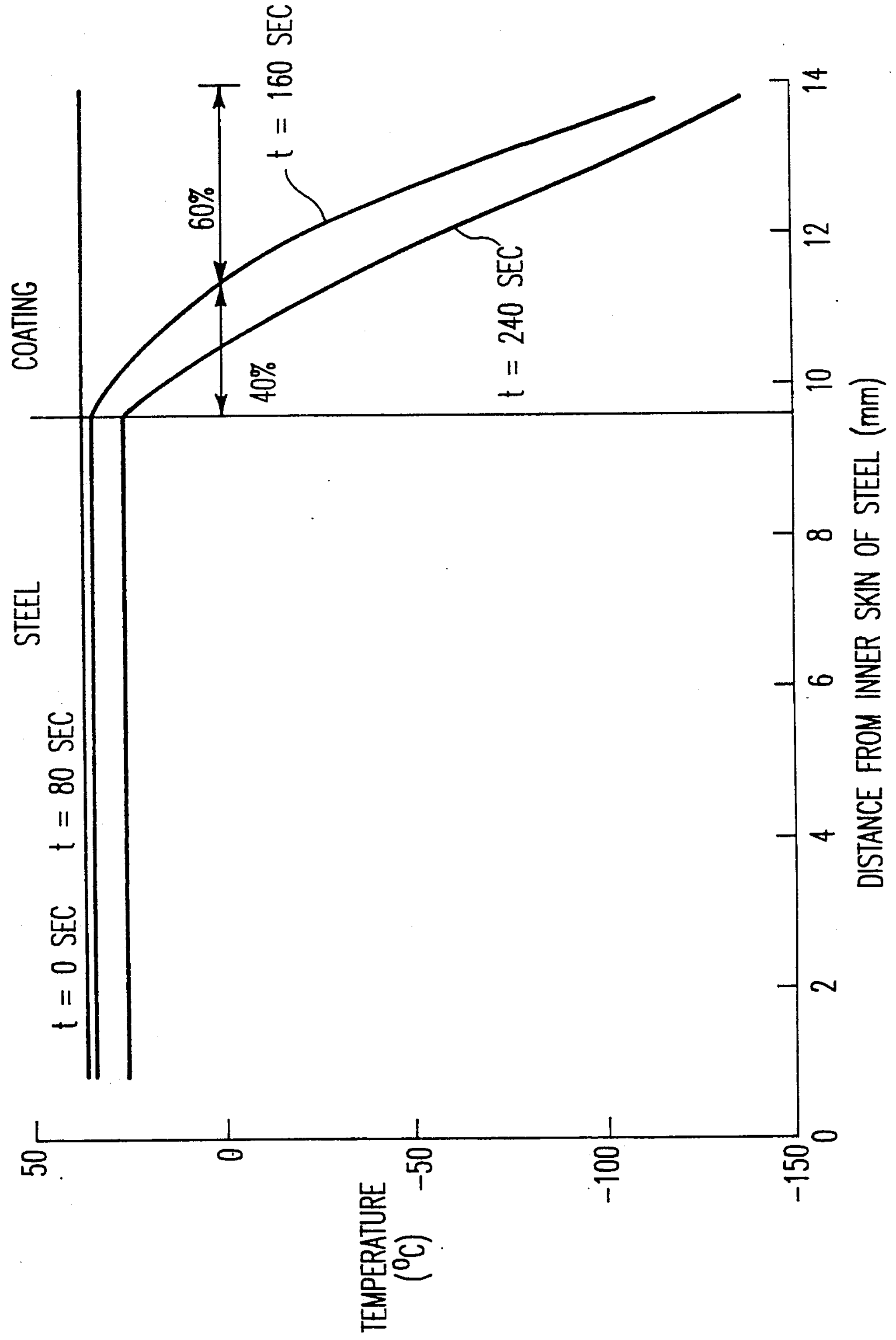
FIG. 12 is a radial temperature profile of a steel support and coating under the conditions of FIG. 9.
Figure 13:
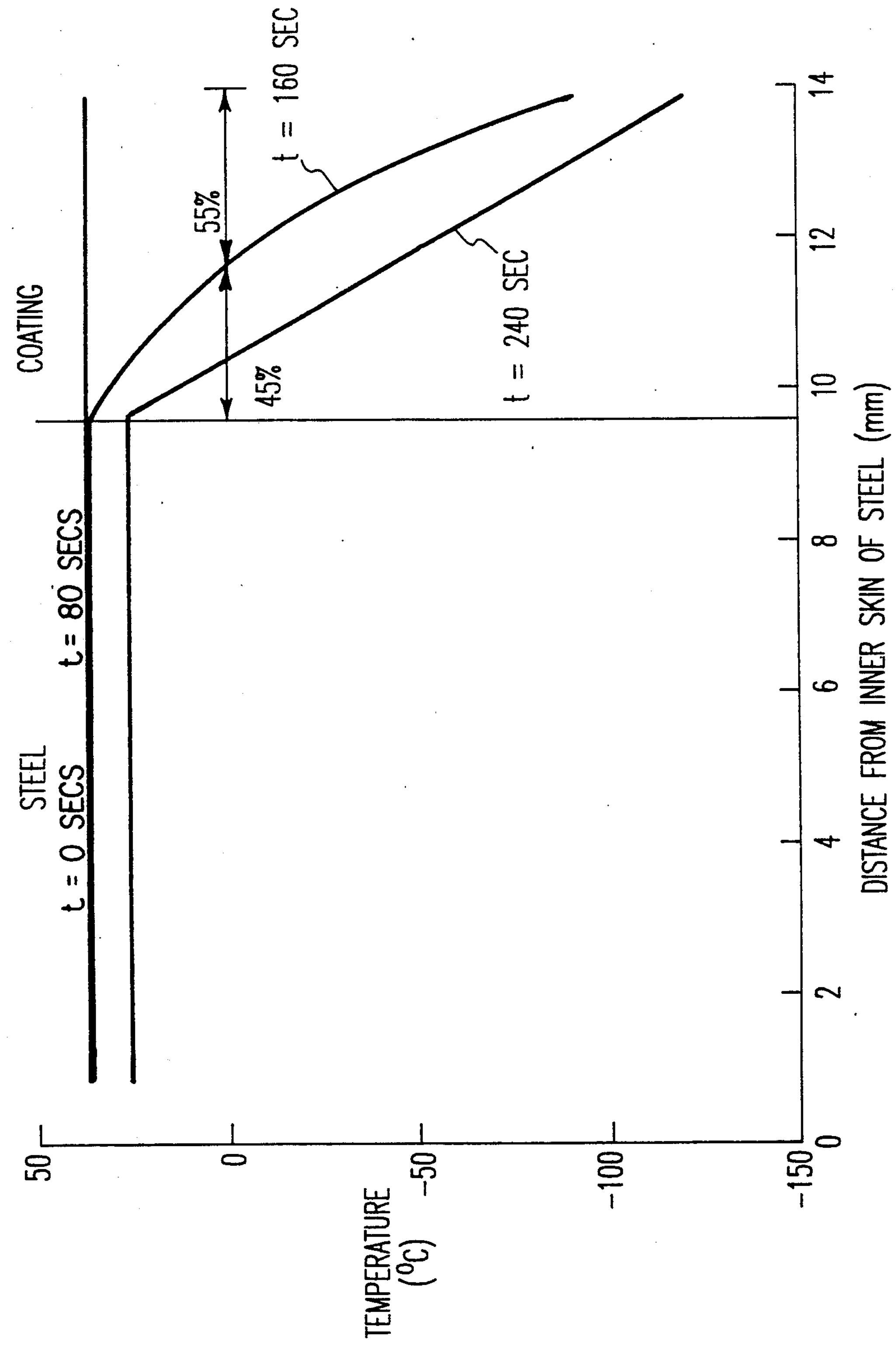
FIG. 13 corresponds to FIG. 12, but for the conditions of FIG. 10.

FIGS. 12 and 13 show the radial temperature profiles of the steel and coating under the conditions of FIGS. 9 and 10. They show that at time 160 seconds (i.e., after 40 seconds of refrigeration, since the tunnel reaches that section at time 120 seconds, or 25% of the total refrigeration time of 160 seconds), the steel temperature has barely been affected but 55% (FIG. 13) to 60% (FIG. 12) of the coating thickness is below 0° C. (32° F.) and, therefore, brittle and removable.

Figure 13A:
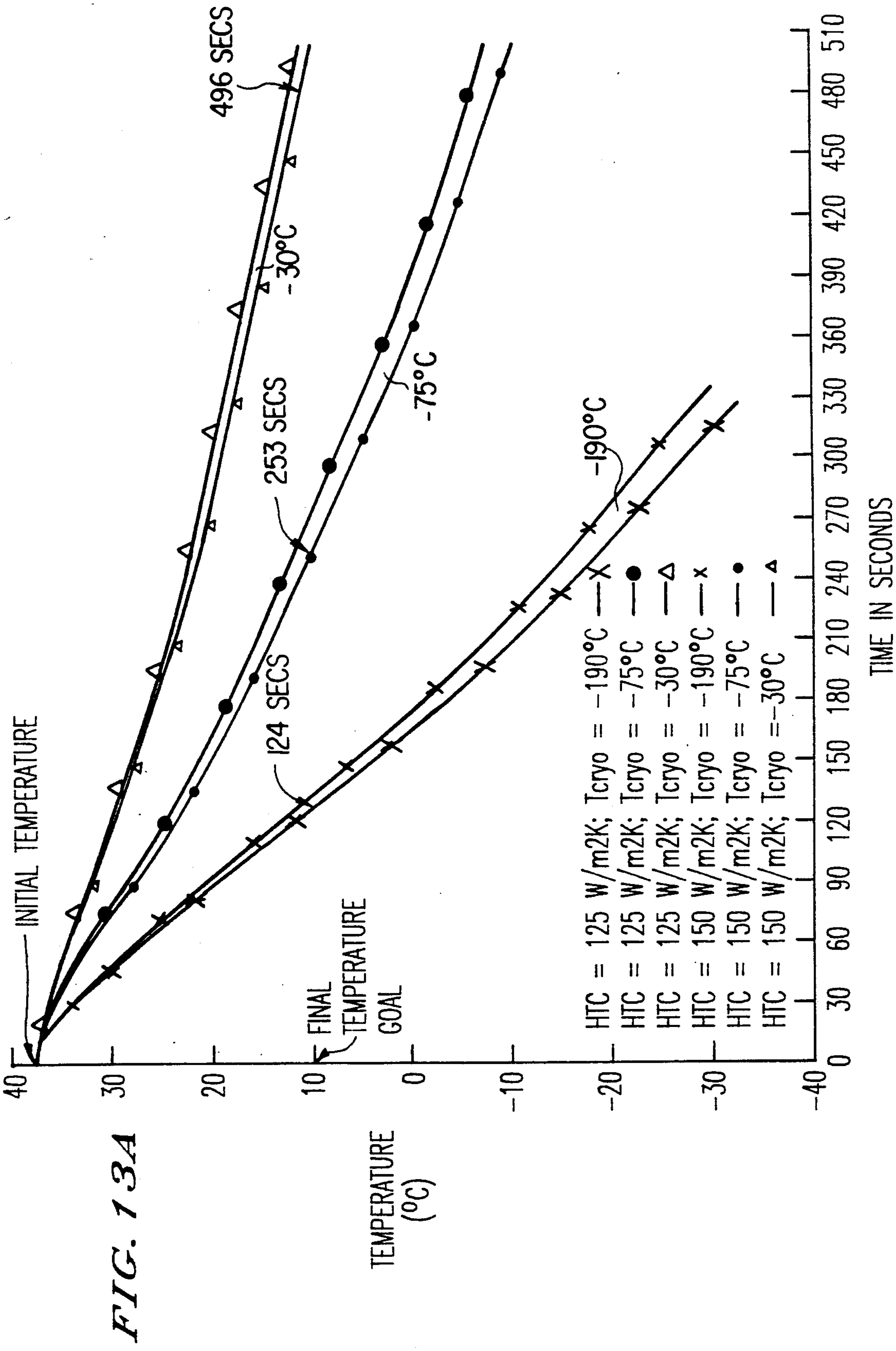
FIG. 13*a* is the result of numerical simulations and the temperature evolution curves of a $\frac{3}{8}$ inch thick steel support coated with 100 mils under different heat transfer conditions, with a heat transfer coefficient of either 125 or 150 $W/m^2K$, and with a refrigerant medium temperature of either −30° C., −75° C. or −190° C.

FIG. 13*a* shows the computed temperature evolution of a ⅜" thick steel support coated with 100 mils when subjected to different refrigeration media, one at −75° C. and one at −30° C., and compared to the refrigeration medium of FIGS. 6 through 10 and of FIGS. 12 through 13, with two applied heat transfer coefficients of 125 and 150 $W/m^2K$. FIG. 13*a* shows why a refrigeration medium of very low temperature, such as liquid nitrogen at −190° C., is preferred to refrigeration media of warmer temperature. Assuming a final temperature goal of 10° C. from an initial temperature of 38° C., that goal is achieved after 253 seconds of refrigeration at −75° C. and after 496 seconds of refrigeration at −30° C. compared to 124 seconds of refrigeration at −190° C. (data correspond to 150 $W/m^2K$). Using those refrigeration media would require one to increase the length of the refrigeration tunnels by respectively 105% and 300% in order to process the coated steel at the same speed as achievable with a −190° C. refrigeration medium.

Figure 13B:
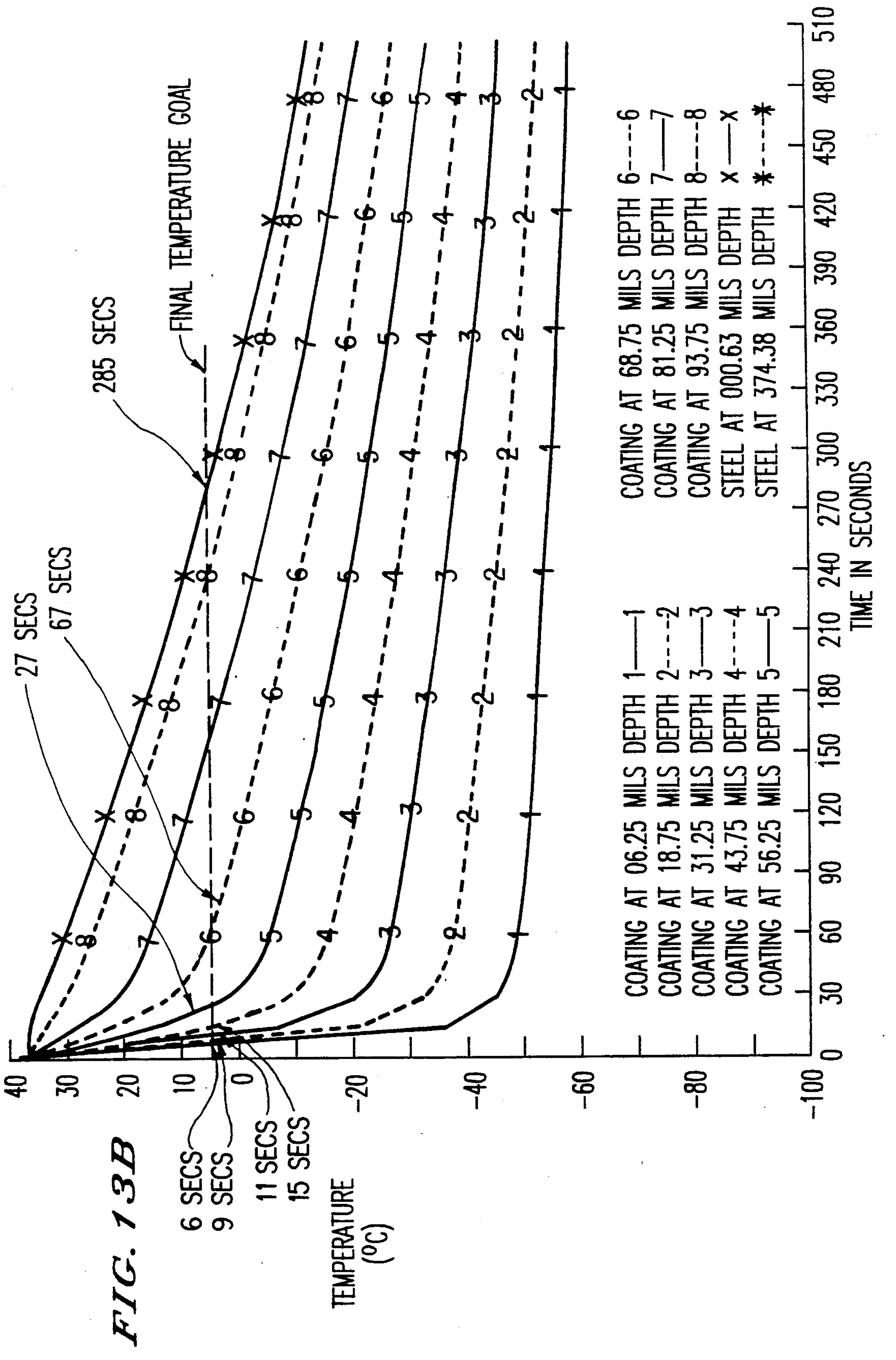
FIG. 13*b* is the result of a numerical simulation and shows the temperature evolution of a $\frac{3}{8}$" thick steel support and the temperature evolutions of various depths in the 100 mils thick coating when the coated steel support is subjected to heat transfer conditions of 200 $W/m^2K$ and −75° C.
Figure 13C:
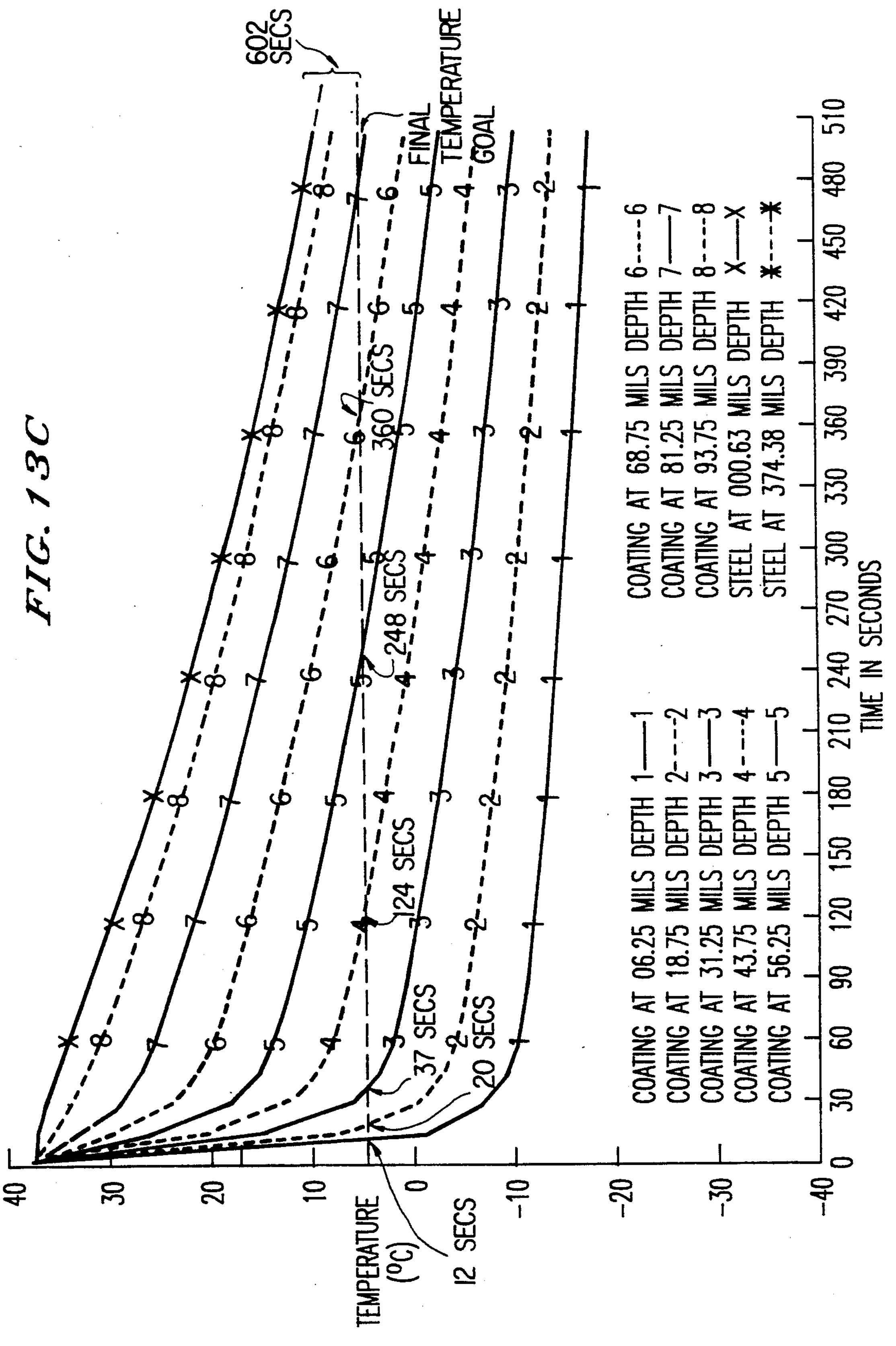
FIG. 13*c* is the result of a numerical simulation and shows the temperature evolution of a $\frac{3}{8}$" thick steel support and the temperature evolutions of various depths in the 100 mils thick coating when the coated steel support is subjected to heat transfer conditions of 150 $W/m^2K$ and −30° C.

Nevertheless, the benefits of the present invention can also be applied to refrigeration tunnels utilizing those warmer refrigeration media as is obvious from FIGS. 13*b* and 13*c* which illustrate the drop in temperature of the ⅜" steel and of the 100 mils coating at several depths in the coating using respectively a −75° C. refrigeration medium and a −30° C. refrigeration medium. Assuming a final temperature goal of 5° C. (41° F., which has proved so far to be sufficient to embrittle bituminous coatings), FIG. 13*b* shows that 285 seconds are necessary to cool the steel interface to that temperature (i.e., 100% of the coating thickness is brittle) but also that:

the upper 6% of coating are brittle after 6 seconds (=2% of total required dwell time)
the upper 19% of coating are brittle after 9 seconds (=3% of total required dwell time)
the upper 31% of coating are brittle after 11 seconds (=4% of total required dwell time)
the upper 43% of coating are brittle after 15 seconds (=5% of total required dwell time)
the upper 56% of coating are brittle after 27 seconds (=9% of total required dwell time)
the upper 69% of coating are brittle after 67 seconds (=24% of total required dwell time)

Similarly, FIG. 13*c* shows that 600 seconds are necessary to cool the steel interface to 41° F. (100% of the coating is then brittle) but also that:

the upper 6% of coating are brittle after 12 seconds (=2% of total required dwell time)
the upper 19% of coating are brittle after 20 seconds (=3% of total required dwell time)
the upper 31% of coating are brittle after 37 seconds (=6% of total required dwell time) the upper 43% of coating are brittle after 124 seconds
(=21% of total required dwell time)
the upper 56% of coating are brittle after 248 seconds (=41% of total required dwell time)
the upper 69% of coating are brittle after 360 seconds (=60% of total required dwell time)

Hence, within less than 25% of the total required dwell time, the upper 45% (at −30° C. refrigeration medium) to 70% (at −75° C. refrigeration medium) of coating are embrittled and removable.

A number of other simulations have been performed to determine the thickness of the upper coating layers that are embrittled after a given refrigeration time. The results are listed below:

Example 1

70 mils thick coating on ⅜" thick steel, initially at 100° F., subjected to −190° C. and 200 $W/m^2K$ refrigeration conditions.

After 10 seconds refrigeration, 50% of the coating (35 mils) is below −16° F. while the steel is still at 97° F.

After 20 seconds refrigeration, 83% of the coating (58 mils) is below 43° F. while the steel is still at 91° F.

Fully 90 seconds of refrigeration are necessary for the coating to reach 41° F. at the steel interface (i.e., the entire coating thickness is embrittled).

Approximately 83 seconds of refrigeration would be necessary for the coating to reach 41° F. at the steel interface if the initial temperature were 95° F.

Example 2

100 mils thick coating on ⅜" thick steel, initially at 100° F. subjected, to −190° C. and 200 $W/m^2K$ refrigeration conditions.

After 4 seconds of refrigeration, 31% (31 mils) of the coating is below 31° F. while the steel is still at 100° F.

After 8 seconds of refrigeration, 44% (44 mils) of the coating is below 31° F. while the steel is still at 100° F.

After 10 seconds of refrigeration, 44% (44 mils) of the coating is below 16° F. and 56% (56 mils) of the coating is below 44° F. while the steel is still at 100° F.

After 12 seconds of refrigeration, 56% (56 mils) of the coating is below 31° F. while the steel is still at 99° F.

After 14 seconds of refrigeration, 56% (56 mils) of the coating is below 10° F. and 69% (69 mils) of the coating is below 48° F. while the steel is still at 99° F.

After 16 seconds of refrigeration, 69% (69 mils) of the coating is below 40° F. while the steel is still at 98° F.

After 50 seconds of refrigeration, 88% (88 mils) of the coating is below 42° F. while the steel is still at 81° F.

Fully 125 seconds of refrigeration are necessary for the coating to reach 41° F. at the steel interface (i.e., for the entire coating thickness to be embrittled).

Approximately 115 seconds of refrigeration would be necessary for the coating to drop to 41° F. at the steel interface if the initial temperature were 95° F.

Example 3

188 mils thick coating on ⅜" thick steel, initially at 95° F., subjected to −150° C. and 180 $W/m^2K$ refrigeration conditions.

After 8 seconds of refrigeration, 25% (47 mils) of the coating is below 41° F. while the steel is still at 95° F.

After 19 seconds of refrigeration, 42% (79 mils) of the coating is below 41° F. while the steel is still at 95° F.

After 20 seconds of refrigeration, 42% (79 mils) of the coating is below 35° F. while the steel is still at 95° F.

After 34 seconds of refrigeration, 58% (109 mils) of the coating is below 41° F. while the steel is still at 94° F.

After 63 seconds, 75% (141 mils) of the coating is below 41° F. while the steel is still at 90° F.

After 70 seconds of refrigeration, 75% (141 mils) of the coating is below 34° F. while the steel is still at 89° F.

Approximately 310 seconds of refrigeration are necessary for the coating to reach 41° F. at the steel interface (i.e., for the entire coating thickness to be embrittled).

Example 4

188 mils thick coating on ⅜" thick steel, initially at 95° F., subjected to −150° C. and 250 W/m$^2$K refrigeration conditions.

After 6 seconds of refrigeration, 25% (47 mils) of the coating is below 41° F. while the steel is still at 95° F.

After 16 seconds of refrigeration, 42% (79 mils) of the coating is below 41° F. while the steel is still at 95° F.

After 20 seconds of refrigeration, 42% (79 mils) of the coating is below 23° F. while the steel is still at 95° F.

After 29 seconds of refrigeration, 58% (109 mils) of the coating is below 41° F. while the steel is still at 94° F.

After 40 seconds of refrigeration, 58% (109 mils) of the coating is below 19° F. while the steel is still at 93° F.

After 50 seconds of refrigeration, 75% (141 mils) of the coating is below 44° F. while the steel is still at 92° F.

After 55 seconds of refrigeration, 75% (141 mils) of the coating is below 41° F. while the steel is still at 91° F.

After 60 seconds of refrigeration, 75% (141 mils) of the coating is below 35° F. while the steel is still at 90° F.

Approximately 290 seconds of refrigeration are necessary for the coating to reach 41° F. at the steel interface (i.e., for the entire coating thickness to be embrittled).

Example 5

125 mils thick coating on ⅜" thick steel, initially at 95° F., subjected to −150° C. and 180 W/m$^2$K refrigeration conditions.

After 5 seconds of refrigeration, 25% (31 mils) of the coating is below 41° F. while the steel is still at 95° F.

After 10 seconds of refrigeration, 42% (53 mils) of the coating is below 41° F. while the steel is still at 95° F.

After 12 seconds of refrigeration, 42% (53 mils) of the coating is below 32° F. while the steel is still at 95° F.

After 19 seconds of refrigeration, 58% (73 mils) of the coating is below 33° F. while the steel is still at 94° F.

After 21 seconds of refrigeration, 58% (73 mils) of the coating is below 32° F. while the steel is still at 94° F.

After 35 seconds of refrigeration, 75% (94 mils) of the coating is below 40° F. while the steel is still at 91° F.

Approximately 190 seconds of refrigeration are necessary for the coating to reach 41° F. at the steel interface (i.e., for the entire coating thickness to be embrittled).

A 60° F. temperature drop, instead of the above 95° F.−41° F.=54° F., would require approximately 190 [secs]*60[°F.]/54°[F.]=210 secs.

Example 6

125 mils thick coating on ⅜" thick steel, initially at 95° F., subjected to −150° C. and 250 W/m$^2$refrigeration conditions.

After 5 seconds of refrigeration, 25% (31 mils) of the coating is below 32° F. while the steel is still at 95° F.

After 9 seconds of refrigeration, 42% (53 mils) of the coating is below 40° F. while the steel is still at 95° F.

After 10 seconds of refrigeration, 42% (53 mils) of the coating is below 32° F. while the steel is still at 95° F.

After 16 seconds of refrigeration, 58% (73 mils) of the coating is below 40° F. while the steel is still at 95° F.

After 18 seconds of refrigeration, 58% (73 mils) of the coating is below 32° F. while the steel is still at 94° F.

After 20 seconds of refrigeration, 58% (73 mils) of the coating is below 23° F. while the steel is still at 94° F.

After 30 seconds of refrigeration, 75% (94 mils) of the coating is below 38° F. while the steel is still at 91° F.

Approximately 170 seconds of refrigeration are necessary for the coating to reach 41° F. at the steel interface (i.e., for the entire coating thickness to be embrittled).

A 60° F. temperature drop, instead of the above 95° F.−41° F.=54° F., would require approximately 170[secs]*[60° F.]/[54° F.]=190 secs.

Example 7

250 mils thick coating on ⅜" thick steel initially at 95° F., subjected to −150° C. and 180 W/m$^2$K refrigeration conditions.

After 29 seconds of refrigeration, 42% (105 mils) of the coating is below 41° F. while the steel is still at 95° F.

After 40 seconds of refrigeration, 42% (105 mils) of the coating is below 16° F. while the steel is still at 95° F.

After 60 seconds of refrigeration, 58% (145 mils) of the coating is below 32° F. while the steel is still at 94° F.

After 100 seconds of refrigeration, 75% (188 mils) of the coating is below 39° F. while the steel is still at 90° F.

Approximately 430 seconds of refrigeration are necessary for the coating to reach 41° F. at the steel interface (i.e., for the entire coating thickness to be embrittled).

The above listed examples show that, under the assumed heat transfer conditions and with an initial temperature of 95° F. and with a coating embrittlement temperature of approximately 41° F.:

- 42% of the coating thickness (upper layers) is brittle after 10 seconds to 29 seconds of refrigeration depending on coating thickness (125 mils to 250 mils), those 10 to 29 seconds representing only 5 to 7% of the total refrigeration time required to embrittle the entire coating thickness by lowering the coating temperature at the steel interface to 41° F.;
- 58% of the coating thickness (upper layers) is brittle after 16 to 60 seconds of refrigeration depending on coating thickness (125 mils to 250 mils), those 16 to 60 seconds representing only 10 to 14% of the total refrigeration time required to embrittle the entire coating thickness;

75% of the coating thickness (upper layers) is brittle after 30 to 100 seconds of refrigeration depending on coating thickness (125 mils to 250 mils), those 30 to 100 seconds representing only 18 to 23% of the total refrigeration time required to embrittle the entire coating thickness.

Hence, Examples 1 through 7 have shown that in less than 25% of the required refrigeration time (using a refrigerant medium of temperature below −150° C.) for complete coating embrittlement, a significant percentage, greater than 25% and more specifically 75% and more, of the coating is brittle. The same conclusion had been reached in the analysis of the effect of refrigerant media at warmer temperatures, where during 25% of the required refrigeration time for complete coating embrittlement, a significant percentage, greater than 25%, is embrittled: the upper 70% of coating when using a refrigeration medium of temperature equal to −75° C. and the upper 40% of coating when using a refrigeration medium of temperature equal to −30° C. As can be seen from the comparisons of those data, the percentage of upper coating embrittlement after 25% of the time required for complete coating embrittlement decreases as the temperature of the refrigeration medium increases, which is a supplementary reason (in addition to the increase in required refrigeration time for complete coating embrittlement when the temperature of the refrigeration medium increases) why a refrigeration medium of very low temperature, such as liquid nitrogen at −190° C., is preferred to refrigeration media of warmer temperature. Hence, with a refrigeration medium of temperature at or below −150° C., in less than 25% (respectively 15%, respectively 7%) of the required refrigeration time for complete coating embrittlement, the upper 75% (respectively 58%, respectively 42%) of the coating is brittle and can be removed. If the remaining 25% (respectively 42%, respectively 58%) of coating can be embrittled and removed, after the first 75% (respectively 58%, respectively 42%) of coating has been removed, in significantly less than 75% (respectively 85%, respectively 93%) of the original refrigeration time, significant reductions in refrigeration equipment length and significant increases in both refrigeration equipment processing speed and processing efficiency could be realized.

The numerical process simulation proves this to be true since a 50 mils thick coating on ⅜" thick steel requires between 60 to 75 seconds for complete embrittlement (i.e., dropping the coating temperature from 95° F. to 41° F. at the steel interface).

The above refrigeration times are derived from numerical simulation with a −190° C. refrigeration medium temperature condition in both cases and with a low heat transfer coefficient of 175 $W/m^2K$ (yielding the larger 75 seconds refrigeration time) and with a higher heat transfer coefficient of 225 $W/m^2K$ (yielding the smaller 60 seconds refrigeration time). The above refrigeration times are in agreement with the 73.6 seconds refrigeration time that was previously derived from FIG. 5*a*, under −190° C. refrigeration medium temperature and 200 $W/m^2K$ heat transfer coefficient, with the same desired final temperature of 41° F., but with a different initial temperature of 100° F. instead of 95° F., thereby corresponding to a refrigeration requirement about 10% greater than in the above two simulation cases. The following procedures can then be considered:

Example 8

Given the conditions of Example 3, initial refrigeration 70 seconds long followed by removal of the upper 75% of the coating, leaving 47 mils of coating, which can be removed after 60 to 75 seconds of refrigeration, bringing the total refrigeration time to 130 to 145 seconds, compared to the original 310 seconds, or a savings by 53% to 58%.

Example 9

Given the conditions of Example 4, the results were the same (in terms of total required dwell time) as in Example 8.

Example 10

Given the conditions of Example 5, initial refrigeration 20 seconds long followed by removal of the upper 58% (at least) of the coating, leaving 52 mils of coating, which can be removed after 60 to 75 seconds of refrigeration, bringing the total refrigeration time to 80 to 95 seconds, compared to the original 190 seconds, or a savings by 50% to 58%.

Example 11

Figure 14:
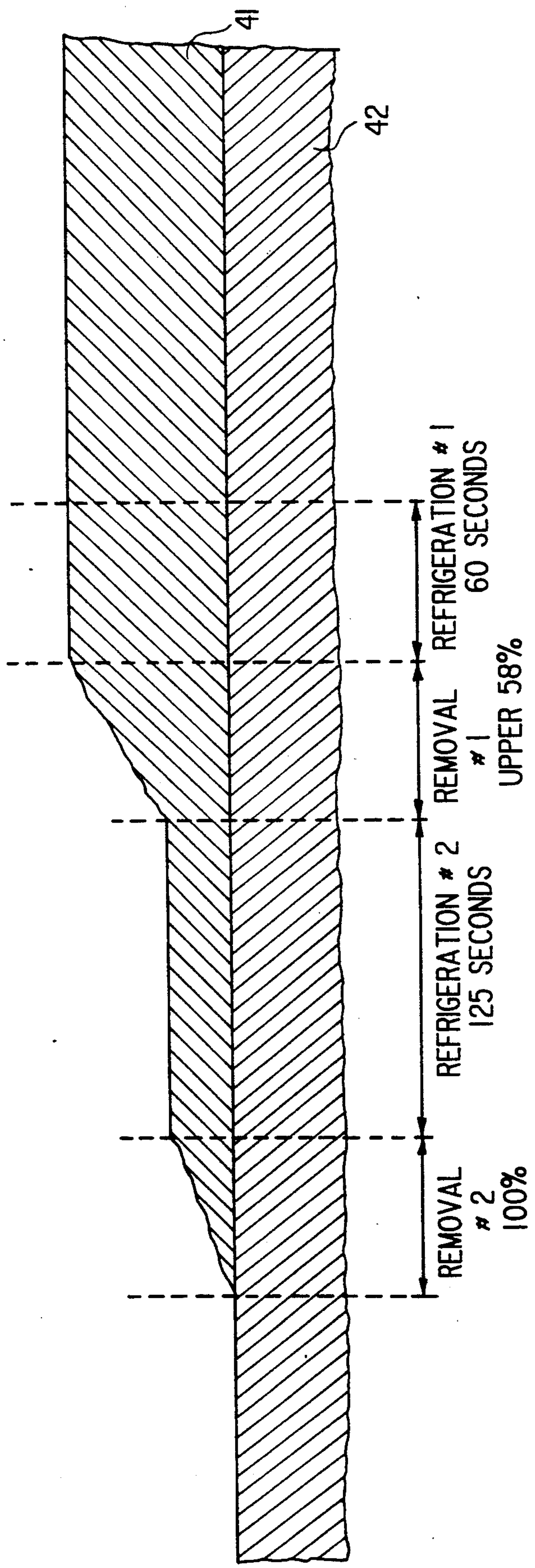
FIG. 14 is a schematic illustration of the coating removal according to the simulation Example 11.

Given the conditions of Example 7, initial refrigeration 60 seconds long followed by removal of the upper 58% (at least) of the coating leaving 105 mils of coating, which can be removed after 125 seconds of refrigeration (same as Example 2), bringing the total refrigeration time to 185 seconds compared to the original 430 seconds, or a savings by 57%. (See FIG. 14 for illustration.)

Figure 15:
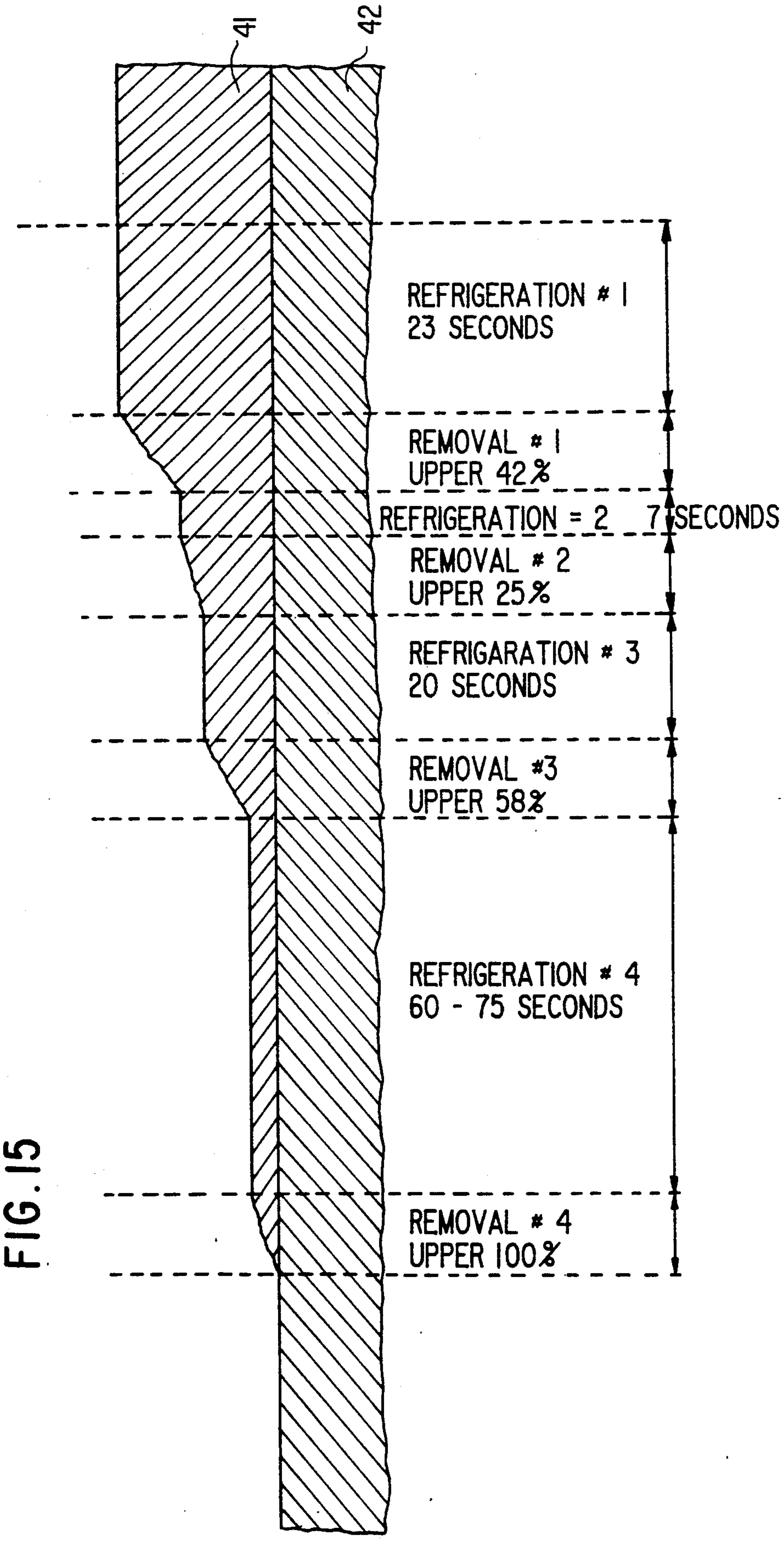
FIG. 15 corresponds to FIG. 14, but is according to the simulation Example 11, scenario 2.

Example 11, Scenario 2 (FIG. 15)

For illustration purposes, a more than two steps process will be considered for the 250 mils thick coating. First refrigeration is 29 seconds long which allows removal of the upper 42% of the coating, leaving 145 mils on the pipe. Second refrigeration (averaging Examples 3 and 5) is 7 seconds long and allows to remove another upper 25% of the coating, leaving 109 mils on the pipe. Third refrigeration (using Example 10 data) is 20 seconds long which allows the removal of the upper 58% of coating, leaving 46 mils of coating which can be removed after 60 to 75 seconds of refrigeration. The total refrigeration time using those four refrigeration (and scraping) steps is 116 to 131 seconds, which represents a savings of 70% to 73% compared to the original 430 seconds required by the single step refrigeration.

Hence, it is quite evident from the theoretical analysis of the thermophysical process and from its numerical simulation under a variety of conditions, that a multistep process will generate savings of at least 50%, and potentially more when using more than two steps, in total required refrigeration time. That 50% savings means that the same total length of refrigeration equipment (element 10 in FIG. 2) can process at twice the speed while maintaining the same refrigerant flowrate, when split in two parts of not necessarily equal lengths while inserting a second cleaning machine between the two new tunnels as shown on FIGS. 3 and 5. Hence, the greater processing speeds required by the pipeline industry are met using this invention without increasing dramatically the length of the refrigeration equipment as would have conventionally been the case. That 50% savings generates a corresponding savings in operating costs, whatever refrigeration method is used, since for the same cost, twice the length of pipe is processed. That 50% operating costs savings translates into a 100% refrigeration efficiency increase. Such savings are especially important when dealing with thicker coatings and when using an expandable cryogen refrigeration source, such as those disclosed in the aforementioned U.S. Patents.

The tunnel disclosed in U.S. patent application Ser. No. 07/434,814 was used on a 30" $\phi$, ⅜" thick (nominal, actual thickness varied between 368 and 398 mils, with an average thickness of 384 mils or 2.5% more than nominal), 60 feet long pipe section coated with one, two and three layers of coal tar tape (specifically TAPECOAT® 20, from the Tapecoat Company, Ill., and which consists of a coal tar pitch saturated high tensile strength fabric which provides a compatible base for the pliable coal tar coating bonded to both sides of the fabric) applied in an overlapping cigarette wrap.

Figure 16:
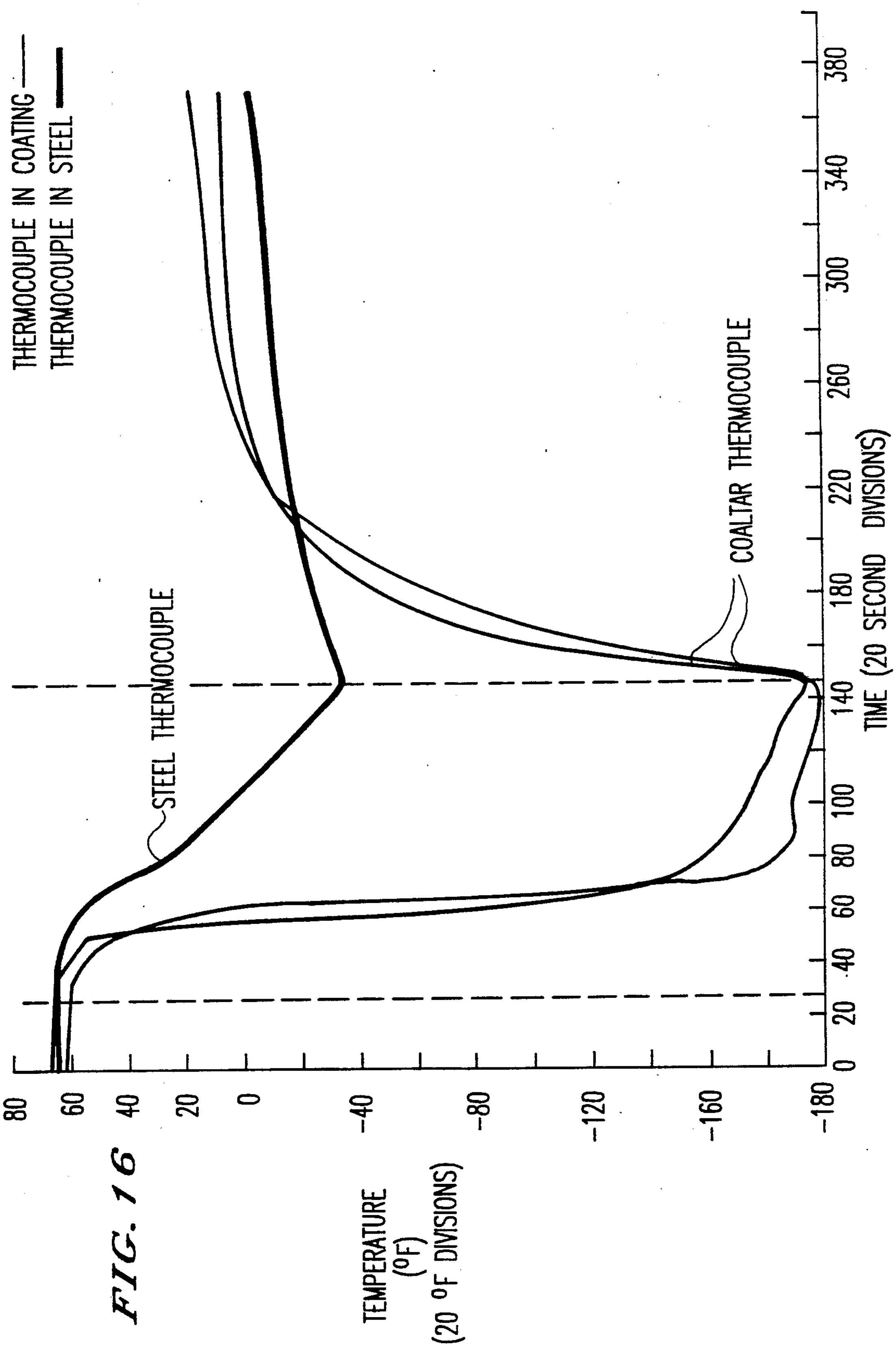
FIG. 16 is a graph showing the temperature evolution of the coating and pipe when the pipe is $\frac{3}{8}$" thick and coated with a 60 mil layer of coal tar tape.

FIG. 16 shows the temperature evolution of a thermocouple imbedded in a single layer 60 mils thick of coal tar tape, together with the temperatures of neighboring steel thermocouples. That figure is of limited use since the depth of the coating thermocouple is not accurately known. However, FIG. 16 clearly indicates how fast the temperature drop is within the coating compared to the steel temperature evolution and the rapid equilibration process, thereby qualitatively confirming the coating temperature evolutions given by the numerical simulation in FIGS. 6, 7, 8 and especially 9 and 10.

Figure 17:
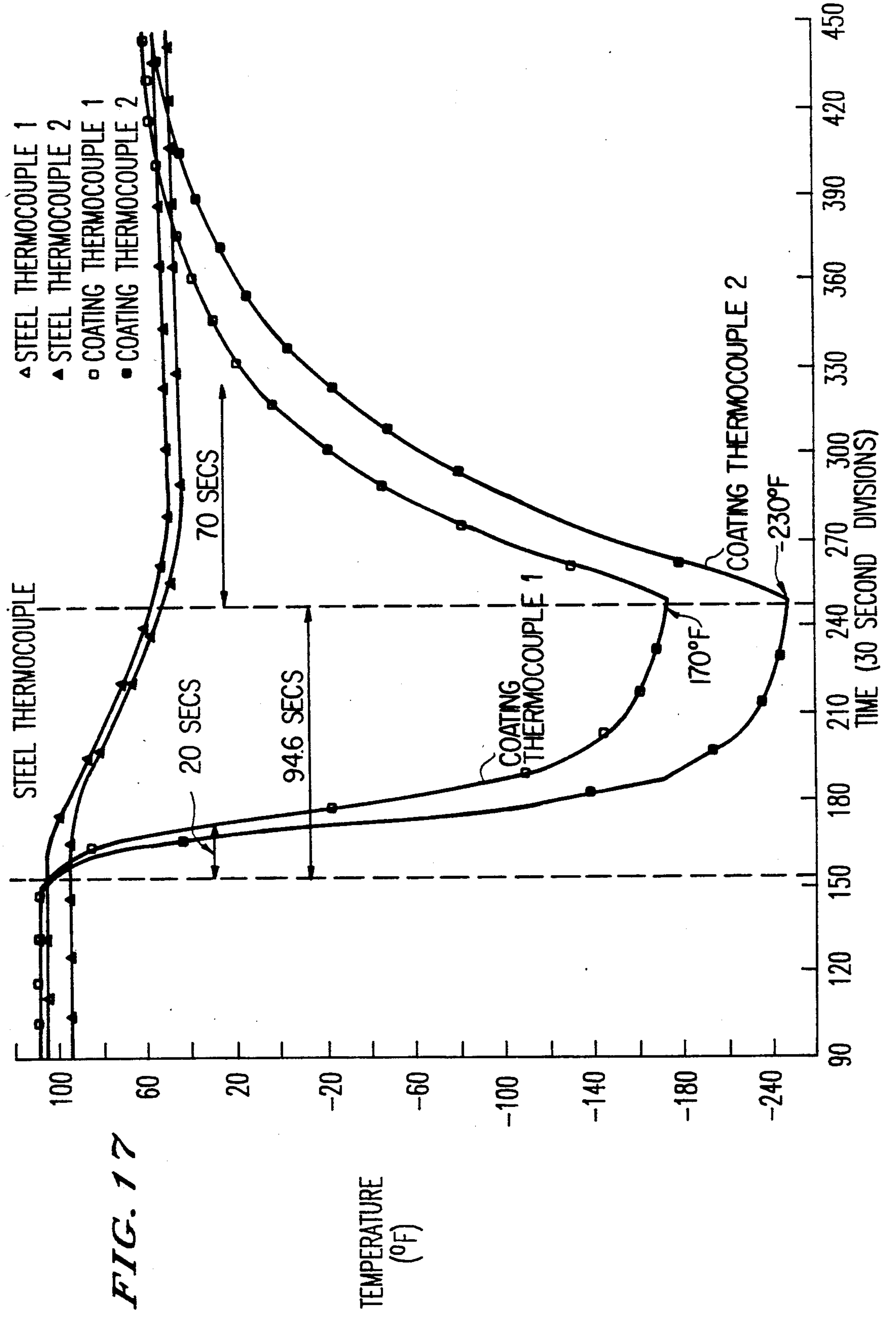
FIG. 17 corresponds to FIG. 16, but at a 60 mil depth in a 120 mil coating.
Figure 18:
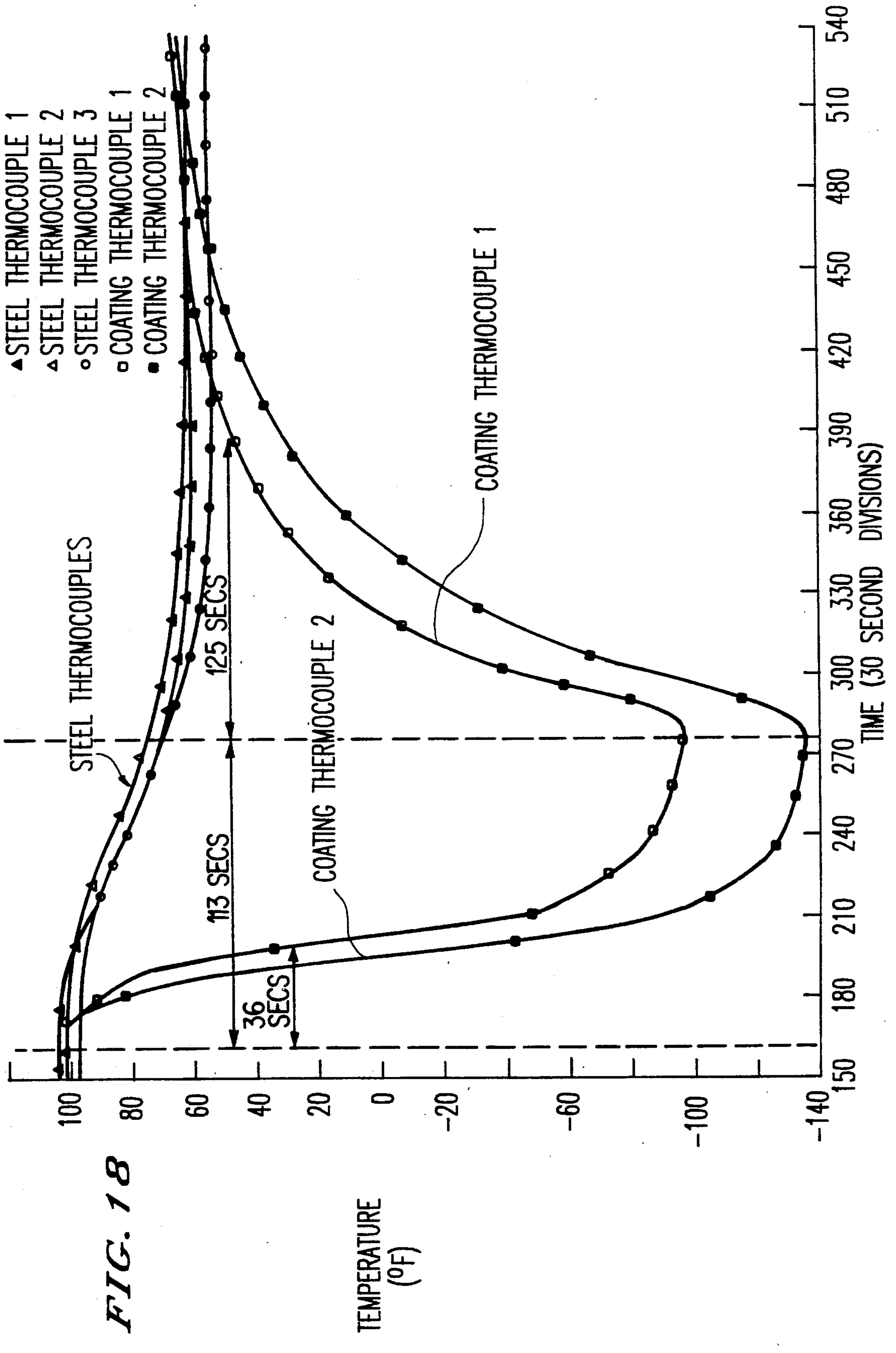
FIG. 18 corresponds to FIG. 17, but at a 120 mil depth in a 180 mil thick coating.

FIGS. 17 and 18 illustrate the benefits that can be derived from the present invention.

FIG. 17 corresponds to a double layer wrapped pipe (total coating thickness 120 mils) and shows the temperature evolution of two thermocouples placed at the interface between the two coating layers, therefore at an approximate depth of 60 mils, together with the temperature evolution of neighboring steel thermocouples.

FIG. 18 corresponds to a triple layer wrapped pipe (total coating thickness 180 mils) and shows the temperature evolution of two thermocouples placed at the interface between the first coating layer (i.e., the layer directly bonded to the steel) and the second and third coating layers, therefore at an approximate coating depth of 120 mils, together with the temperature evolution of neighboring steel thermocouples.

Both Figures confirm qualitatively the thermophysical process illustrated by the coating and steel temperature evolutions of FIGS. 9 and 10, although the coating thermocouple depth of FIGS. 17 and 18 is different from that of FIGS. 9 and 10.

In the case of a 120 mils coating thickness (FIG. 17), the coating at 60 mils depth drops to −170° F. to −230° F. during the 94.6 seconds long spraying process. When extrapolating the two coating thermocouple curves, it is apparent that the coating temperature levels at the end of the spraying process are very nearly the asymptotic values. The two neighboring steel thermocouples dropped by only 47° F. and 53° F., respectively, during that spraying process, followed by an equilibration process which lasted about 70 seconds and dropped the steel temperature by a further 10° to 11° F., during which time the coating at 60 mils depth has warmed up to respectively −35° F. and 5° F.

Of interest is how quickly the coating at 60 mils depth drops to a temperature low enough, say 30° F. to be conservative, to render the upper 50% of coating brittle and removable. The test shows that that magnitude of temperature drop occurs within 20 seconds (about 21% of the total spraying process). Assuming that the steel temperature drop slope remain constant, it would take a dwell time of approximately 115 seconds to drop the average temperature of those two steel locations by 60° F., i.e., to around 40° F. (average since one steel thermocouple would drop from initially 104° F. to 44° F. within 105 seconds and the other steel thermocouple would drop from initially 93° F. to 33° F. within 115 seconds).

The above described test was performed with a tank head pressure of 20 to 21 psig, yielding an average $LN_2$ flowrate of 39.75 gpm, or 2.95 gal/min/foot of tunnel. Under similar $LN_2$ driving force conditions, tests on 60 mils coated pipe have shown a refrigeration speed of 66.9° F./min (averaged over eight tests) at those steel locations. Hence, the 115 second long single step refrigeration process could be replaced by a first refrigeration step 20 seconds long, which allows to removal of the upper 60 mils of coating, followed by a second refrigeration step 60[°F.]/66.9[°F./min]*60[secs/min]=54 seconds long, which allows removal of the remaining 60 mils of coating (based on the assumption of a required 60° F. temperature drop for embrittlement, the same assumption that was used to obtain the single step required dwell time of 115 seconds). Hence, the single step 115 seconds of refrigeration is replaced by a total two step refrigeration time of 20+54=74 seconds, which represents a 36% savings. The savings realized are smaller than the 50% to 58% forecast in Example 10 but are still significant. The lower than forecasted reduction in required total refrigeration time is explained and moderated in the discussion following the tunnel length and specific linear consumption comparisons between the single-step and the dual-step refrigeration-/embrittlement/removal processes.

Given the above listed $LN_2$ flowrates and the above listed refrigeration times, $LN_2$ consumptions per foot and tunnel lengths required to drop the steel temperature at those two locations on the pipe by 60° F. (where one location may see a slightly greater temperature drop because of an actual refrigeration field [heat transfer coefficient] and of a steel to coating bond [heat conduction contact resistance] that are not perfectly uniform along the circumference of the pipe) at various speeds can be computed. The single step refrigeration process (115 seconds long) requires the following:

| Desired processing speed | 24 fpm | 18 fpm | 12 fpm | 6 fpm |
|---|---|---|---|---|
| Required tunnel length | 46' | 34'6" | 23' | 11'5" |
| Specific consumption (60° F. drop) | 5.65 gpf | 5.65 gpf | 5.65 gpf | 5.65 gpf |

The tunnel disclosed in U.S. patent application No. 07/434,814 has a length of 13.5', and would, therefore, be unable to process the 120 mils coated pipe at speeds exceeding 7 fpm to achieve a 60° F. minimum temperature drop at those two locations on the pipe.

The first step of the dual step refrigeration process (20 seconds long) requires the following:

| Desired processing speed | 24 fpm | 18 fpm | 12 fpm | 6 fpm |
|---|---|---|---|---|
| Required tunnel length | 8' | 6' | 4' | 2' |
| Specific consumption | 0.98 gpf | 0.98 gpf | 0.98 gpf | 0.98 gpf |

-continued

| |
|---|
| (60° F. drop) |

The second step of the dual step refrigeration process (54 seconds) requires:

| | | | | |
|---|---|---|---|---|
| Desired processing speed | 24 fpm | 18 fpm | 12 fpm | 6 fpm |
| Required tunnel length | 21'5" | 16' | 10'10" | 5'5" |
| Specific consumption (60° F. drop) | 2.66 gpf | 2.66 gpf | 2.66 gpf | 2.66 gpf |

Combination of the two refrigeration speeds yields therefore:

| | | | | |
|---|---|---|---|---|
| Desired processing speed | 24 fpm | 18 fpm | 12 fpm | 6 fpm |
| Required tunnel length | 29'5" | 22' | 14'10" | 7'5" |
| Specific consumption (60° F. drop) | 3.64 gpf | 3.64 gpf | 3.64 gpf | 3.64 gpf |

which shows the savings that the present invention yields when comparing those data to those of the single refrigeration step. The total refrigerant consumption is reduced from 5.65 gpf to 3.64 gpf, representing a 36% savings. At same total tunnel length, the dual step refrigeration process proceeds 55% ((115 [secs]/74-[secs]−1)*100) faster than the single step refrigeration-/embrittlement/removal process.

Measured refrigeration times (single-step and dual-step) are smaller than the refrigeration times obtained through simulation (74 seconds versus 80 to 95 seconds [from Example 10] in dual step, and for a 60° F. temperature drop, 115 seconds versus 190 [from Example 5] to 210 [from Example 6] seconds in single step) which suggests that the coating may have a slightly higher heat conductivity or that the heat transfer conditions at the coating's skin are stronger than assumed in the simulations, or a combination thereof. A possible explanation for the smaller than expected savings in total required dwell time and in total required specific consumption is that the coating thermocouples imbedded themselves preferentially in the first coating layer, thereby increasing the actual coating thermocouple depth compared to 60 mils and increasing artificially the measured refrigeration time for the coating at 60 mils depth to drop to 30° F.

The explanation of a greater than 60 mils coating thermocouple depth is logical: first because examples 5 and 6 indicate that the coating at 60 mils depth should have been refrigerated to 30° F. or below within no less than 10 seconds (Example 6) to 12 seconds (Example 5) but within no more than 18 seconds (Example 6) to 21 seconds (Example 5); second because the above comparison between measured and numerical simulations derived refrigeration times shows that the actual heat transfer process is faster than the one simulated; third because the combination of the above listed first and second explanations has as corollary that the actual coating at 60 mils depth with the actual refrigeration equipment has to drop to 32° F. within significantly less than 18 to 21 seconds of refrigeration time (since those are the times given by the simulation and since the simulation is conservative).

It is possible to correct somewhat for the greater than 60 mils thermocouple depth and the ensuing conservative savings estimates. Examples 5 and 6 give total required refrigeration times of 190 seconds and 210 seconds respectively, or 65% and 80% respectively more than the total refrigeration time of 115 seconds extrapolated from actual test results of FIG. 17 (all refrigeration times refer to the same condition, namely a 60° F. temperature drop in the steel). Assuming that the numerical simulation derived required refrigeration times of 18 to 21 seconds for the coating at 60 mils to drop to 32° F. or less are similarly overestimated, new estimates would yield no less than 6 (10/1.65) to 7 (12/1.8) seconds and no more than 11 (18/1.65) to 12 (21/1.80) seconds refrigeration time for the 60 mil depth in the coating to drop to 32° F. or below. The dual step total required refrigeration time can now be reestimated at no less than 6+54=60 seconds but no more than 12+54=66 seconds, which translates into a savings, from the dual step process compared to the single step process, of no less than 43% [(1−66/115)*100] but no more than 48% [(1−60/115)*100].

In the case of a 180 mils coating thickness (FIG. 18), the coating at 120 mils depth drops to −100° F. and −140° F., respectively within the 113 seconds of spraying during that test (conditions were 21.5 to 22.5 psig at the tank, yielding an $LN_2$ flowrate of 41.3 gpm or 3.06 gallons/min/foot of tunnel). When extrapolating the two coating thermocouple curves, it is apparent that the coating temperature levels at that depth at the end of the spraying process are very nearly the asymptotic values. The three neighboring steel thermocouples dropped by only 36° F., 29.4° F. and 30.1° F. during that spraying process, followed by an equilibration process which lasted about 125 seconds and decreased the steel temperature at those locations by respectively another 12° F., 13.8° F. and 18.2° F., during which time the coating at 120 mils depth has warmed up to 25° F. and 45° F., respectively.

Of interest is how quickly the coating at 120 mils depth drops to a temperature low enough, say 30° F. to be conservative, to render the upper 2/3 of the coating brittle and removable. The test shows that that temperature drop occurs within 36 seconds (about 32% of the total spraying process time).

Figure 19:
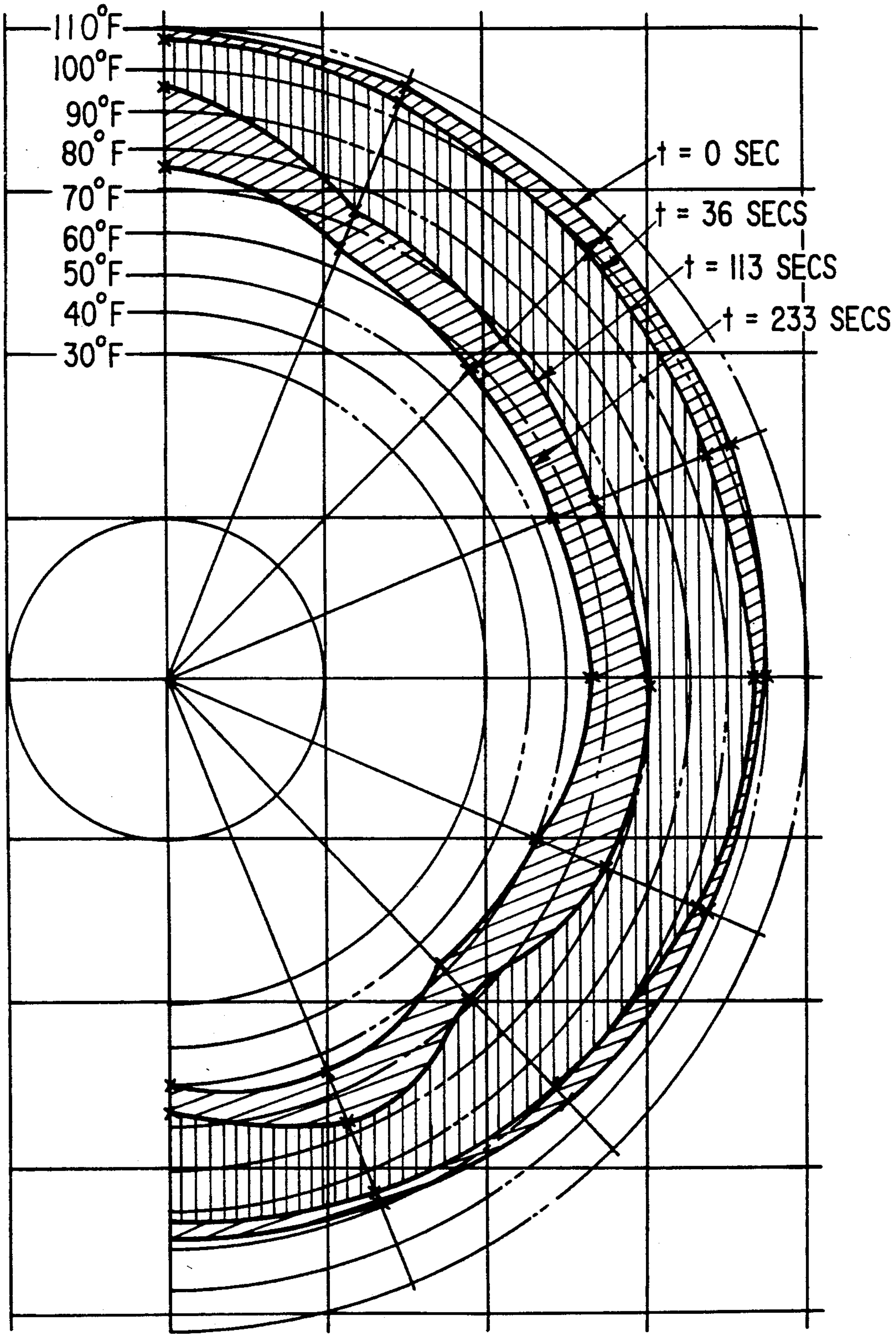
FIG. 19 illustrates a circumferential temperature profile of a steel pipe support of $\frac{3}{8}$" thickness and coated with a 180 mil coating at different spray time and thermal equilibration periods.

FIG. 19 illustrates the temperature profiles of the 180 mil coated, 3/8 inch thick steel at the start of the spraying process, after 36 seconds of spraying (average temperature drops of −4.0° F. on top of the pipe, −3.5° F. on sides of the pipe and −2.75° F. on bottom of the pipe), after the entire 113 seconds long spraying process and after 120 seconds of equilibration. Only one half of the pipe is represented but the temperatures shown are the averages between right and left halves of the pipe. If we assume that the temperature slopes of the steel remain constant when increasing the spraying process dwell time, we can estimate the time that would have been necessary to drop the temperature of the steel of the pipe by 60° F. averaged over the circumference of the pipe. In 113 seconds, the top of the pipe lost 30.0° F., the sides lost 31.3° F. and the bottom lost 28.2° F., yielding a circumferentially averaged temperature drop of 29.9° F. A 60° F. temperature drop on the average over the pipe circumference would, therefore, require 113 secs×60.0/29.9=227 secs of spraying. Given the test conditions ($LN_2$ flowrate), that dwell time translates into $LN_2$ consumption per linear foot, and tunnel length, required to drop the pipe temperature on the average by 60° F. at various speeds, as listed below:

| | | | | |
|---|---|---|---|---|
| Desired processing speed: | 24 fpm | 18 fpm | 12 fpm | 6 fpm |
| Required tunnel length: | 90'10" | 68'2" | 45'5" | 22'9" |
| Specific consumption (60° F. drop): | 11.75 gpf | 11.75 gpf | 11.75 gpf | 11.75 gpf |

The tunnel disclosed in U.S. patent application No. 07/434,814 has a length of 13.5' and would, therefore, be unable to process the 180 mils coated pipe at speeds exceeding 3.5 fpm to achieve a 60° F. temperature drop on the average over the pipe circumference during the spraying process.

However, after 36 seconds of spraying, the upper ⅔ of the coating is brittle and can be removed by mechanical means. The pipe is then left with a 60 mils coating. To be conservative, the steel temperature drop during the 36 seconds of spraying will be neglected and we will postulate a required 60° F. temperature drop for the steel on the average over the circumference of the pipe. Tests performed on 60 mils coal tar tape coated pipe under similar $LN_2$ driving force have shown (average of 6 tests) that the steel refrigeration speed, circumferentially averaged, is 58.25° F./min under an average liquid nitrogen flowrate of 41.6 gpm or 3.08 gallons/min/foot of tunnel.

The above listed 58.25° F./min refrigeration rate is an average over the circumference of the pipe and averages the higher local refrigeration rates on the top half of the pipe (see U.S. patent application No. 07/434,814), and is therefore lower than the above listed 66.9° F./min refrigeration rate which was local and on the top half of the pipe.

Hence, a 60° F. steel temperature drop averaged on the pipe circumference will require 61.8 seconds, bringing the total refrigeration time to 36+61.8=97.8 seconds compared to 227 seconds, or a savings of 57%, which corresponds well with the numerical simulation results of Example 8.

The second refrigeration step, of specified duration, requires a certain tunnel length and generates a certain consumption to drop the steel temperature on the average over the pipe circumference by 60° F. at various processing speeds, as listed below:

| | | | | |
|---|---|---|---|---|
| Desired processing speed: | 24 fpm | 18 fpm | 12 fpm | 6 fpm |
| Required tunnel length: | 24'9" | 18'7" | 12'4" | 6'2" |
| Specific consumption (60° F. drop): | 3.17 gpf | 3.17 gpf | 3.17 gpf | 3.17 gpf |

The tunnel length and specific consumption of the first refrigeration step can be similarly determined. However, to be on the conservative side, spray durations of not only 35 seconds, but also 40, 45 and 50 seconds will be considered. The results are listed below.

| Desired processing speed: | 24 fpm | 18 fpm | 12 fpm | 6 fpm |
|---|---|---|---|---|
| (a) 35 seconds spraying: | | | | |
| Tunnel length | 14' | 10.5' | 7' | 3.5' |
| Specific consumption | 1.81 gpf | 1.81 gpf | 1.81 gpf | 1.81 gpf |
| (b) 40 seconds spraying: | | | | |
| Tunnel length | 16' | 12' | 8' | 4' |
| Specific consumption | 2.07 gpf | 2.07 gpf | 2.07 gpf | 2.07 gpf |
| (c) 45 seconds spraying: | | | | |
| Tunnel length | 18' | 13.5' | 9' | 4.5' |
| Specific consumption | 2.33 gpf | 2.33 gpf | 2.33 gpf | 2.33 gpf |
| (d) 50 seconds spraying: | | | | |
| Tunnel length | 20' | 15' | 10' | 5' |
| Specific consumption | 2.58 gpf | 2.58 gpf | 2.58 gpf | 2.58 gpf |

Although this was only partially tested, the specific consumptions of the first cooling step can be further reduced by 15% when operating under 15 psig tank head pressure and by 30% when operating under 10 psig tank head pressure since it is believed that the 120 mils upper coating layer heat conduction is the process limiting factor and that consequently decreasing the pressure at the $LN_2$ spraying nozzles would have little effect on the required spray duration and tunnel length.

Combining the tunnel length and specific consumption of first and second refrigeration steps and comparing the results to those of the single step refrigeration process yields the savings obtained through the present invention.

The combination yields the following results (the ranges are due to the 35 to 50 second duration range given to the first refrigeration step):

| Desired Speed | Total Tunnels (1 + 2) Length | Total Specific Consumption |
|---|---|---|
| 24 fpm | 38'9" to 44'9" | 4.98 to 5.75 gpf |
| 18 fpm | 29' to 33'6" | 4.98 to 5.75 gpf |
| 12 fpm | 19'4" to 22'4" | 4.98 to 5.75 gpf |
| 6 fpm | 9'8" to 11'2" | 4.98 to 5.75 gpf |

Comparison to the single step refrigeration process on ⅜" thick steel pipe coated with 180 mils of coal tar (3 layers of coal tar tape) shows that:

A: the total specific consumption is reduced by 6.00 to 6.75 gpf, or by 51% to 58%;

B: the total refrigeration equipment length is reduced by 51% to 58%;

C: the capital costs in refrigeration tunnels is reduced by the same percentage;

D: the refrigeration equipment is much easier to handle since it now consists in two smaller and separate tunnels, each less than 30% (first tunnel length is between 15% and 22% of single step refrigeration tunnel length while second tunnel length is approximately 27% of single step refrigeration tunnel length) of the length of the single step refrigeratin tunnel;

E: although a second tracked $LN_2$ vessel is added, the capital costs of the complete refrigeration equipment are still lower by 51% to 58%, since with the single refrigeration step process, the single vessel must have twice the combined capacity of the two vessels according to the invention, since the consumptions are more than double;

F: the overall process efficiency is increased by 105% to 140%, since the consumptions to achieve the same result are reduced by 51% to 58%;

G: the operating costs are reduced, but by less than 51% to 58%, since one second cleaning machine, side boom and operator are required: given the costs (approximate) of the cleaning machine ($30,000/month rental), of the side boom ($10,000/month rental) and of the operator ($20/hr), the operating costs savings are reduced by $0.13 when operating at 24 fpm or by $0.52 when operating at 6 fpm. Hence, the total operating costs compared to the prior art are reduced by 40% to 54% depending on processing speed and on first refrigeration step duration.

H: MOST IMPORTANTLY, the present invention enables the processing of even thick coatings, such as the 180 mil thick coating of the above example, at high speeds and at reduced operating and capital costs.

The above outlined embodiments of the invention, as applied to a 180 mil coated, ⅜ inch thick steel support, have a second tunnel to first tunnel length ratio of 1.25 to 1.75. Although there is a large flexibility in that ratio, it is recommended that the second refrigeration tunnel be in no case smaller than the first tunnel (i.e. the above ratio must always be greater than 1) in a two step process. A ratio of around 2 and a ratio of around 3 would be practical with respect to the sizing of the $LN_2$ vessels, when the tunnels move at this same speed and deliver the same flowrate of refrigerant per foot of tunnel length (first vessel would be 2,000 gallons capacity, second vessel would be 4,000 gallon capacity with a ratio of 2, and 6,000 gallon capacity with a ratio of 3). In the case of the ⅜" thick steel pipe coated with 120 mils of coal tar that was previously discussed (FIG. 17), the ratio would be close to 3 (54 seconds dwell time for second tunnel versus 20 seconds, and probably less, dwell time for first tunnel, both tunnels moving at the same speed).

As a final comparison, we can compare the test data of FIG. 18 to the numerical simulation results of FIGS. 6, 7, 8, 9, 10, 12 and 13.

FIGS. 6, 7 and 8 show that a 60° F. temperature drop in a ⅜" thick steel substrate covered by 188 mils of coating would require between 280 and 290 seconds of spraying. The test data indicate 227 seconds. Consequently, as was observed in the discussion of FIG. 17, it is likely that the heat transfer conditions on the outer coating skin are greater than assumed (250 W/m$^2$, −190° C.) or that the heat conductivity of the coal tar is somewhat higher than assumed (0.15 W/mK) or a combination thereof. The same conclusions can be reached when comparing the data of Examples 3 and 4 to the test data of FIG. 18.

FIGS. 12 and 13 indicate that the upper 60%, respectively 54% of the coating were embrittled within 40 seconds of spraying. Again the test data show a faster process since 67% of the upper coating was embrittled within 36 seconds.

FIGS. 9 and 10 clearly agree with the equilibration process shown in FIG. 18. The test data indicate that the equilibration process is faster than numerically simulated since 125 seconds are sufficient compared to 190 seconds in the simulation. This indicates that the coal tar coating does have a higher than expected heat conductivity, but also that the difference is not large.

With respect to the equilibration process shown in FIG. 18, it was observed that: The closest steel thermocouples (3 thermocouples) indicate an averaged decrease of 12.4° F. during the 120 seconds following the end of the spraying process, which represents a loss of 19.5 Btu/sqft. The coating at 120 mils depth warmed from −95° F./−135° F. to 45° F./25° F. respectively during those 120 seconds. The coating at the steel interface is at the steel temperature (given by ratio of both component's thermal effusivities) and at the outer surface is assumed to be at −300° F. at the end of the spraying and at 32° F. after 120 seconds of equilibration (due to film condensation/freezing of ambient atmosphere humidity together with natural convection). That, together with the specific mass and specific heat and thickness of the coating leads to a gain by the coating of 75 Btu/sqft. Hence:

the coating does act as a cold reservoir when thick enough (180 mils in this case);

the amount of cold stored is ample enough to explain the steel's temperature drop during equilibration;

as an order of magnitude, 25% of the cold stored in the 180 mils thick coating is transferred to the steel while the remaining 75% are transferred to the outer skin and then to the ambient atmosphere.

Figure 20:
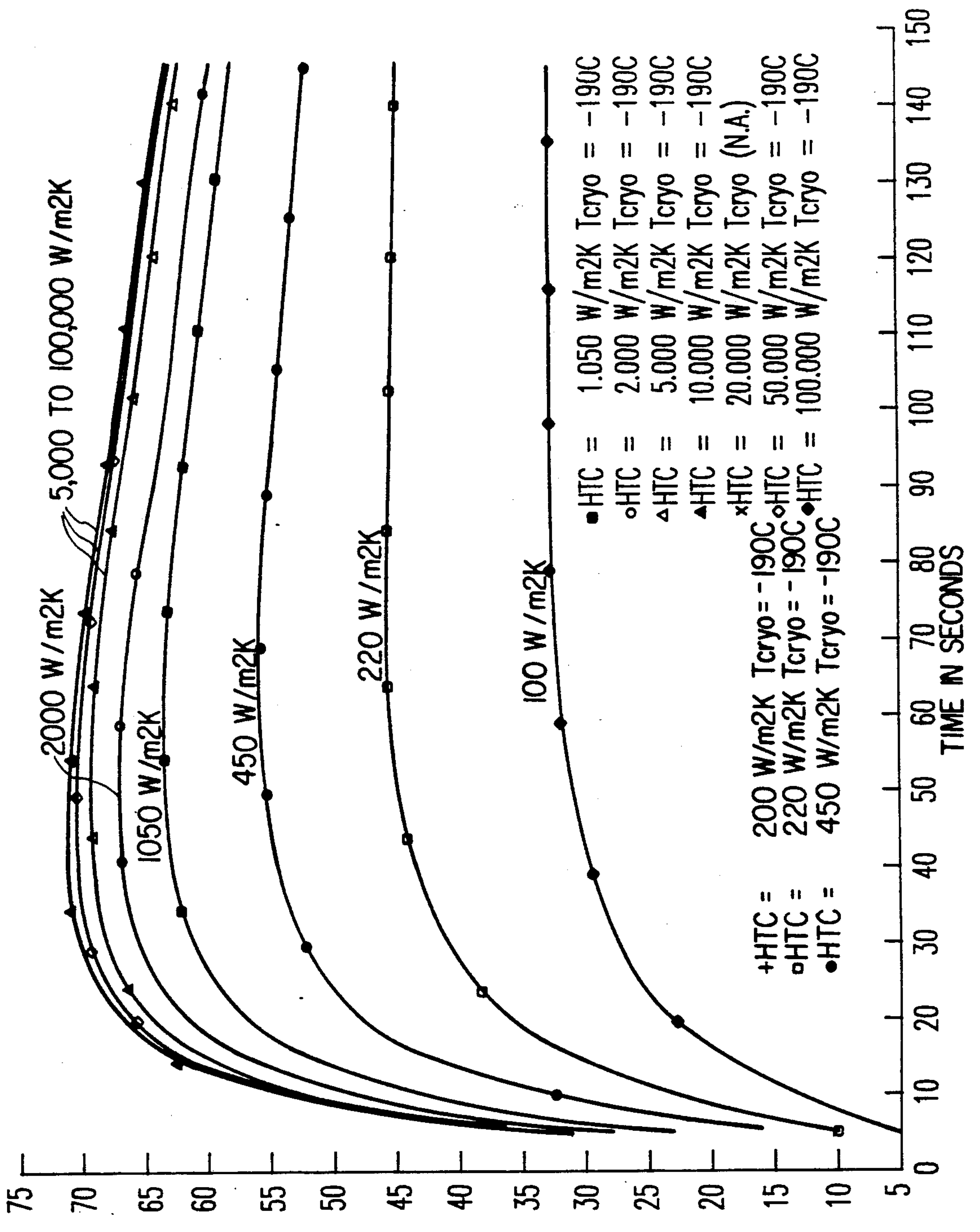
FIG. 20 is the result of numerical simulations and shows, at any given time between 0 and 150 seconds, the average steel refrigeration rate (i.e., the temperature drop of the steel between time zero and that given time, divided by that given time) for a $\frac{3}{8}$ inch thick steel support with a 58 mils thick coating of 0.15 W/mK heat conductivity subjected to a refrigerant medium temperature of −190° C. and to various heat transfer coefficients ranging from 100 $W/m^2K$ to 100,000 $W/m^2K$.

FIG. 20 is a graph resulting from several numerical simulations of the refrigeration of ⅜" thick steel support coated by 58 mils of coal tar (conditions similar to those of FIG. 16). That graph shows at any time t the average (i.e., cumulative as opposed to instantaneous) refrigeration rate of the steel between time zero and time t, for various heat transfer coefficients (100 to 100,000 W/m$^2$) and for a refrigeration medium of −190° C. temperature (liquid or gaseous nitrogen). The graph shows that the refrigeration rate starts at low values (due to the lag in the cold front propagation from the coating outer layer to the steel), climbs to a maximum value and then decreases slowly because of the reduced heat transfer driving force due to, first a still slowly decreasing outer layer temperature and second, and more importantly, a reduced temperature gradient in the coating. The graph shows that the heat transfer coefficient significantly affects the refrigeration, as is to be expected, but that the refrigeration rate has an upper boundary of about 70° F./min because of the limit imposed by the insulating coating. That limit can be easily verified by computing the maximum heat flux through the coating. The maximum gradient is the difference between 38° C. and −190° C. divided by the thickness of the coating, or almost 155,000° C./m. Multiplying by the coating heat conductivity yields an outgoing heat flux of 23.2 kW/m$^2$. Dividing by the mass of steel under the unit area of coating and by its specific heat yields the maximum instantaneous refrigeration rate of 0.71° C./second or 77° F./min which corresponds well with FIG. 20. Of interest is how soon that upper limit is reached. There are obviously few changes between 5,000 and 100,000 W/m$^2$. A heat transfer coefficient of 2,000 W/m$^2$K achieves 95% of the maximum average (i.e., cumulative) refrigeration rate. Such high heat transfer coefficients are possible when dealing with a boiling liquid (see for example Transactions of the ASME, Journal of Heat Transfer, May 1990, Vol. 112, p. 430 to 450, paper by Sakurai, Shistsu, Hata).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process of removing low thermal conductivity coatings from an elongate support with high efficiency and speed, comprising the steps of:

a first cooling step of moving an enclosing tunnel means along the length of said support while applying a low temperature refrigeration medium onto said coating for a time sufficient to cool a first portion of the thickness of the coating to a temperature below an embrittlement temperature thereof, said first portion being less than the entire thickness of the coating;

after said first cooling step, performing a first removal step of removing the embrittled first portion of the coating while leaving a remaining coating;

at least one further cooling step of moving another enclosing tunnel means along the length of said support while applying a low temperature refrigeration medium onto said remaining coating for a time sufficient to cool a portion of the thickness of said remaining coating to a temperature below the embrittlement temperature thereof; and after each said at least one further cooling step, performing a further removal step of removing the embrittled portion of the remaining coating, wherein said at least one further cooling step includes a final cooling step in which said portion of the thickness of the remaining coating is the entirety of the thickness of the remaining coating.

2. The process of claim 1 wherein said low temperature refrigeration medium comprises at least one of a gas at a specific temperature which is vented around said coating and said support and a liquid at the specific temperature which is applied to the coating and the support.

3. The process of claim 2 wherein said specific temperature is lower than said embrittlement temperature.

4. The process of claim 2 wherein said specific temperature is a cryogenic temperature lower than said embrittlement temperature by at least 200° F.

5. The process of claim 1 wherein said support comprises a material having substantially higher thermal conductivity and effusivity than said coating.

6. The process of claim 1 wherein said support comprises a metal pipe, wherein said first portion of the coating is a radially outer portion of said coating.

7. The process of claim 6 wherein said coating comprises an organic coating.

8. The process of claim 7 wherein said organic coating comprises at least one from the group consisting of hot or cold applied coal tars, coal tar epoxies, asphalt, polyethylene, phenolic baked epoxies, amine cured epoxies and polyvinyl chloracetates.

9. The process of claim 8, wherein said organic coating incorporates inorganic films or fabrics.

10. The process of claim 1 wherein at least one of said cooling steps comprises spraying $LN_2$ onto said coating.

11. The process of claim 2 wherein said cooling steps each comprise:

continuously moving one of the enclosing tunnel means along the length of a pipe; and spraying $LN_2$ onto a portion of the coating enclosed by said tunnel means.

12. The process of claim 10 wherein said at least one of said removal steps comprises one of scraping the embrittled coating and blasting the embrittled coating with sand or grit.

13. The process of claim 11 wherein said removal steps each comprises using a removal device positioned immediately downstream of the tunnel means, in the direction of movement of the tunnel means, to scrape the embrittled coating.

14. The process of claim 13 wherein said removal steps, other than a final one of said further removal steps, comprise using as the removal device a pipeline traveling scraper with rotating knifes or brushes or a combination thereof.

15. The process of claim 13 wherein a final one of said further removal steps comprises using as the removal device one of a pipeline traveling scraper fitted with rotating knives or brushes or a combination thereof, and a pipeline traveling sand- or grit-blaster or a combination thereof said removal device in said final one of said further removal steps being selected as a function of the thickness of the coating to be removed thereby and as a function of a final pipe surface aspect.

16. The process of claim 11 wherein said tunnel means continuously moves at a speed of at least 6 feet per minute.

17. The process of claim 16 wherein said speed of said tunnel means is selected such that at least the outer layers of said coating or coating residue are embrittled during passage of said tunnel means and such that all layers of the residue of said coating after a next to last coating removal step are embrittled during the passage of the tunnel means of said cooling final step.

18. The process of claim 17 wherein the temperature of the coating between said first portion of the coating and said remaining coating is reduced by a specific amount to the embrittlement temperature specific to said coating during said first cooling step and wherein the temperature of the steel is reduced by a specific amount to the embrittlement temperature specific to said coating during the final cooling step.

19. The process of claim 18 wherein said embrittlement temperature is lower than 60° F.

20. The process of claim 18 wherein said embrittlement temperature is approximately 40° F. for bituminous coatings.

21. The process of claim 18 where said specific amount in each of said cooling steps is greater than 20° F.

22. The process of claim 18 where said specific amount in each of said cooling steps is approximately 60° F.

23. The process of claim 16 wherein said first portion of the thickness of said coating comprises at least 20% of the thickness of said coating.

24. The process of claim 16 wherein said first portion of the thickness of said coating comprises between 50% and 75% of the thickness of said coating.

25. The process of claim 16 wherein said coating has a thickness of at least 10 mils.

26. The process of claim 25 wherein said coating has a thickness of between 50 mils and 250 mils.

27. The process of claim 11 wherein the tunnel means in said at least one further cooling step has a length up to four times greater than the length of the tunnel means in the first cooling step.

28. The process of claim 27 wherein the tunnel means in said at least one further cooling step has a length about twice that of the tunnel means in the first cooling step.

29. The process of claim 27 wherein the tunnel means in said at least one further cooling step has a length about three times that of the tunnel means in the first cooling step.

30. The process of claim 1 wherein said at least one further cooling step comprises at least two further cooling steps.

* * * * *